US012675345B2

(12) United States Patent
Xie et al.

(10) Patent No.: US 12,675,345 B2
(45) Date of Patent: Jul. 7, 2026

(54) METHOD FOR PERFORMING DRAWING OPERATION BY APPLICATION AND ELECTRONIC DEVICE

(71) Applicant: Huawei Technologies Co., Ltd., Shenzhen (CN)

(72) Inventors: Bing Xie, Hangzhou (CN); Shuai Zhou, Hangzhou (CN); Chengkai Tang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 394 days.

(21) Appl. No.: 18/466,894

(22) Filed: Sep. 14, 2023

(65) Prior Publication Data

US 2023/0418696 A1 Dec. 28, 2023

Related U.S. Application Data

(63) Continuation of application No. PCT/CN2022/081926, filed on Mar. 21, 2022.

(30) Foreign Application Priority Data

Mar. 24, 2021 (CN) .......................... 202110316341.X

(51) Int. Cl.
| | |
|---|---|
| *G06F 9/54* | (2006.01) |
| *G06F 9/448* | (2018.01) |
| *G06F 9/451* | (2018.01) |
| *G06F 9/48* | (2006.01) |
| *G06F 9/50* | (2006.01) |

(52) U.S. Cl.
CPC .............. *G06F 9/545* (2013.01); *G06F 9/451* (2018.02)

(58) Field of Classification Search
None
See application file for complete search history.

(56) References Cited

U.S. PATENT DOCUMENTS

| | | | | |
|---|---|---|---|---|
| 2011/0096077 | A1* | 4/2011 | Jarrett ..................... | G06T 13/00 |
| | | | | 345/473 |
| 2017/0371394 | A1* | 12/2017 | Chan ..................... | G06F 1/3218 |
| 2018/0261190 | A1* | 9/2018 | Yi ........................... | G06F 9/451 |
| 2018/0365032 | A1* | 12/2018 | Zeng ...................... | G06F 9/451 |

(Continued)

FOREIGN PATENT DOCUMENTS

| | | |
|---|---|---|
| CN | 106327540 A | 1/2017 |
| CN | 106933587 A | 7/2017 |

(Continued)

OTHER PUBLICATIONS

Android Alvin et al:"Analysis of _Background Invalid Animation_ Behavior in Android." Sep. 2, 2020. total 4 pages.

*Primary Examiner* — Mustafa A Amin
(74) *Attorney, Agent, or Firm* — Slater Matsil, LLP

(57) ABSTRACT

This application provides a method for performing a drawing operation by an application and an electronic device. The method for performing a drawing operation by an application includes: determining a background drawing frequency of an application program; and when the application program is switched to a background application, intercepting a drawing operation of the application program, so that the application program performs the drawing operation at the background drawing frequency.

19 Claims, 26 Drawing Sheets

(56)  References Cited

U.S. PATENT DOCUMENTS

| | | | |
|---|---|---|---|
| 2019/0188030 A1* | 6/2019 | Qiao | G06F 9/5088 |
| 2019/0391780 A1* | 12/2019 | Song | H04L 67/75 |
| 2020/0005736 A1* | 1/2020 | Peng | G09G 5/377 |
| 2020/0380752 A1* | 12/2020 | Fu | G09G 5/00 |
| 2021/0109644 A1 | 4/2021 | Chen et al. | |

FOREIGN PATENT DOCUMENTS

| | | | |
|---|---|---|---|
| CN | 108646906 | A | 10/2018 |
| CN | 109815017 | A | 5/2019 |
| CN | 110175062 | A | 8/2019 |
| CN | 110928396 | A | 3/2020 |
| CN | 111787602 | A | 10/2020 |
| CN | 113553130 | A | 10/2021 |
| JP | 2019153883 | A | 9/2019 |
| WO | 2013125405 | A1 | 8/2013 |

* cited by examiner (A)

(B)

(A)

(B)

METHOD FOR PERFORMING DRAWING OPERATION BY APPLICATION AND ELECTRONIC DEVICE

CROSS-REFERENCE TO RELATED APPLICATIONS

This application is a continuation of International Application No. PCT/CN2022/081926 filed on Mar. 21, 2022, which claims priority to Chinese Patent Application No. 202110316341.X, filed on Mar. 24, 2021. The disclosures of the aforementioned applications are hereby incorporated by reference in their entireties.

TECHNICAL FIELD

This application relates to the field of electronic technologies, and in particular, to a method for performing a drawing operation by an application and an electronic device.

BACKGROUND

With popularization of electronic devices such as smartphones, tablets, and wearable devices, when using an electronic device such as a smartphone, a user often inadvertently starts a plurality of or even dozens of application programs. In use, a screen of the smart device can only display a few application programs for the user to browse and interact. If the user does not completely close application programs in the background in time, after use for a period of time, the user is to feel obvious frame freezing, heat generation, and an increase in power consumption.

This is because after the application programs change from foreground applications to background applications, the application programs still occupy system resources of the electronic device, such as memory and CPU computing load, and perform a drawing operation. For the background applications, because the background applications do not provide a visual interface or view for the user, the drawing operation is performed invalidly. However, the invalid drawing operation still occupies the system resources of the electronic device. As a result, power consumption of the electronic device increases, and system resources of the foreground applications are occupied.

To reduce occupation of system resources by the background applications, when an application program becomes a background application or after a period of time, the electronic device may actively freeze the application, so that the application does not continuously occupy the system resources.

However, a frozen application is usually woken up by a broadcast, a service, or the like. Like another unfrozen background application, a woken background application still occupies system resources and performs an invalid drawing operation. As a result, the background application occupies the system resources of the foreground applications, leading to an increase in power consumption of the electronic device.

SUMMARY

Embodiments of this application provide a method for performing a drawing operation by an application. A frequency at which a background application performs an invalid drawing operation is reduced by intercepting a vertical synchronization signal or a callback method in a choreographer, or deleting an animation event task saved by a choreographer. In this way, occupation of system resources by the background application is reduced, and power consumption of the electronic device is reduced.

According to a first aspect, this application provides a method for performing a drawing operation by an application. The method includes: An electronic device starts a first application program. The electronic device performs a drawing operation at a first frequency when the first application program is a foreground application, where the drawing operation is for drawing a view for the first application program. The electronic device performs the drawing operation at a second frequency after the first application program is switched from the foreground application to a background application, where the second frequency is less than the first frequency. The first frequency is a frequency at which the first application program receives a vertical synchronization signal.

In the foregoing embodiment, after determining that the application program is switched from the foreground application to the background application, the electronic device reduces the drawing frequency of the application program, and the drawing frequency is lower than the frequency at which the application program receives a vertical synchronization signal. This can reduce occupation of system resources by the background application, and can reduce heat generation and power consumption of the electronic device.

With reference to some embodiments of the first aspect, in some embodiments, after the first application program is switched from the foreground application to the background application, the electronic device indicates a choreographer of the first application program to respond to only N vertical synchronization signals in K received vertical synchronization signals, so that the electronic device performs the drawing operation at the second frequency, where K is a positive integer, and N is a positive integer less than K.

In the foregoing embodiment, the electronic device indicates the choreographer of the application program to respond to only some of the received vertical synchronization signals. This reduces the frequency of performing the drawing operation, and further reduces occupation of system resources by the background application, and heat generation and power consumption of the electronic device.

With reference to some embodiments of the first aspect, in some embodiments, after the first application program is switched from the foreground application to the background application, the electronic device indicates a choreographer of the first application program to process only animation event tasks corresponding to N vertical synchronization signals in K received vertical synchronization signals, so that the electronic device performs the drawing operation at the second frequency, where K is a positive integer, and N is a positive integer less than K.

In the foregoing embodiment, the electronic device indicates the choreographer of the application program to process only animation event tasks corresponding to some vertical synchronization signals in the received vertical synchronization signals. This reduces the frequency of performing the drawing operation, and further reduces occupation of system resources by the background application, and heat generation and power consumption of the electronic device.

With reference to some embodiments of the first aspect, in some embodiments, after the first application program is switched from the foreground application to the background application, the electronic device deletes animation event tasks corresponding to K-N vertical synchronization signals in K vertical synchronization signals received by a choreographer of the first application program, so that the electronic device performs the drawing operation at the second frequency, where K is a positive integer, and N is a positive integer less than K.

In the foregoing embodiment, the electronic device deletes the animation event tasks saved by the choreographer of the application program, so that the drawing operation performed by the background application is a null operation. This reduces occupation of system resources by the background application, and heat generation and power consumption of the electronic device.

With reference to some embodiments of the first aspect, in some embodiments, a ratio of N to K corresponds to a ratio of the second frequency to the first frequency.

With reference to some embodiments of the first aspect, in some embodiments, the ratio of N to K is equal to the ratio of the second frequency to the first frequency.

With reference to some embodiments of the first aspect, in some embodiments, after the first application program is switched from the foreground application to the background application, when the application program does not receive vertical synchronization signals at the first frequency, but receives vertical synchronization signals at a third frequency, the electronic device performs the drawing operation at a frequency lower than a fourth frequency, where the third frequency is less than the first frequency, and the fourth frequency is less than or equal to the third frequency and is greater than 0.

In the foregoing embodiment, the application program is allowed to perform the drawing operation at a frequency that does not exceed a specific value. This reduces the frequency of performing the drawing operation, and further reduces occupation of system resources by the background application, and heat generation and power consumption of the electronic device.

With reference to some embodiments of the first aspect, in some embodiments, when the first application program receives a first vertical synchronization signal, the electronic device determines whether a time difference between a time when the first application program receives the first vertical synchronization signal and a time when the first application program performs the drawing operation last time is less than a reciprocal of the fourth frequency. If the time difference is less than the reciprocal, the electronic device intercepts a first drawing operation, where the first drawing operation is a drawing operation performed by the first application program in response to the first vertical synchronization signal. If the time difference is not less than the reciprocal, the electronic device performs the first drawing operation.

In the foregoing embodiment, when the application program performs the drawing operation for a purpose of not refreshing an interface, the application program is allowed to perform the drawing operation at a frequency that does not exceed a specific value. This reduces the frequency of performing the drawing operation, and further reduces occupation of system resources by the background application, and heat generation and power consumption of the electronic device. Moreover, a dynamic balance is achieved between closure and performance of the system.

With reference to some embodiments of the first aspect, in some embodiments, the electronic device determines the second frequency according to a drawing frequency limiting policy and the first application program.

In the foregoing embodiment, the electronic device may determine, according to the drawing frequency limiting policy, frequencies of performing drawing operations by different application programs. This helps implement differentiated allocation of system resources at the same time, and reduces heat generation and power consumption of the electronic device.

With reference to some embodiments of the first aspect, in some embodiments, the electronic device determines, based on an activity manager service and/or a cpuset parameter of a process of the first application program, that the first application program is the foreground application or the background application.

In the foregoing embodiment, it can be determined, based on the activity manager service and/or the cpuset parameter of the process of the application program, whether the application program is switched from the foreground application to the background application, to improve recognition accuracy of the background application, more accurately reduce the frequency at which the background application performs the drawing operation, and further reduce heat generation and power consumption of the electronic device.

With reference to some embodiments of the first aspect, in some embodiments, N is equal to 0.

In the foregoing embodiment, when the application program is the background application, the electronic device may indicate the application program not to perform the drawing operation, so that the application program releases a system resource, to reduce heat generation and power consumption of the electronic device.

With reference to some embodiments of the first aspect, in some embodiments, N is equal to K.

In the foregoing embodiment, when the application program is the background application, each time when/after the application program receives a vertical synchronization signal, the animation event tasks saved by the application program may be deleted, so that all drawing operations performed by the application program are null operations, to release more system resources, and further reduce heat generation and power consumption of the electronic device.

According to a second aspect, this application provides a method for performing a drawing operation by an application. The method includes: An electronic device starts a first application program. The electronic device displays an interface of the first application program, and the electronic device performs a drawing operation at a first frequency, where the drawing operation is for drawing a view for the first application program. The electronic device closes display of the interface of the first application program, and the electronic device performs the drawing operation at a second frequency, where the second frequency is less than the first frequency. The first frequency is a frequency at which the first application program receives a vertical synchronization signal.

In the foregoing embodiment, when the application program closes display of the interface, it is not necessary to refresh the interface by performing the drawing operation. The electronic device can reduce the frequency at which the application performs the drawing operation, so that occupation of system resources by the background application can be reduced, and heat generation and power consumption of the electronic device can be reduced.

With reference to some embodiments of the second aspect, in some embodiments, the electronic device closes display of the interface of the first application program, where the first application program is a background application.

In the foregoing embodiment, when the application program does not display the interface and is a background application, it is not necessary to refresh the interface by performing the drawing operation. The electronic device can reduce the frequency of performing the drawing operation by the application, so that occupation of system resources by the background application can be reduced, and heat generation and power consumption of the electronic device can be reduced.

With reference to some embodiments of the second aspect, in some embodiments, the electronic device indicates a choreographer of the first application program to respond to only N vertical synchronization signals in K received vertical synchronization signals, so that the electronic device performs the drawing operation at the second frequency, where K is a positive integer, and N is a positive integer less than K.

In the foregoing embodiment, the electronic device indicates the choreographer of the first application program to process only animation event tasks corresponding to N vertical synchronization signals in K received vertical synchronization signals, so that the electronic device performs the drawing operation at the second frequency, where K is a positive integer, and N is a positive integer less than K.

With reference to some embodiments of the second aspect, in some embodiments, when the electronic device does not display the interface of the first application program, the electronic device indicates a choreographer of the first application program to process only animation event tasks corresponding to N vertical synchronization signals in K received vertical synchronization signals, so that the electronic device performs the drawing operation at the second frequency, where K is a positive integer, and N is a positive integer less than K.

In the foregoing embodiment, the electronic device indicates the choreographer of the application program to process only animation event tasks corresponding to some vertical synchronization signals in the received vertical synchronization signals. This reduces the frequency of performing the drawing operation, and further reduces occupation of system resources by the background application, and heat generation and power consumption of the electronic device.

With reference to some embodiments of the second aspect, in some embodiments, the electronic device deletes animation event tasks corresponding to K-N vertical synchronization signals in K vertical synchronization signals received by a choreographer of the first application program, so that the electronic device performs the drawing operation at the second frequency, where K is a positive integer, and N is a positive integer less than K.

In the foregoing embodiment, the electronic device deletes the animation event tasks saved by the choreographer of the application program, so that the drawing operation performed by the background application is a null operation. This reduces occupation of system resources by the background application, and heat generation and power consumption of the electronic device.

With reference to some embodiments of the second aspect, in some embodiments, a ratio of N to K corresponds to a ratio of the second frequency to the first frequency.

With reference to some embodiments of the second aspect, in some embodiments, the ratio of N to K is equal to the ratio of the second frequency to the first frequency.

With reference to some embodiments of the second aspect, in some embodiments, after the electronic device closes display of the interface of the first application program, when the application program does not receive vertical synchronization signals at the first frequency, but receives vertical synchronization signals at a third frequency, the electronic device performs the drawing operation at a frequency lower than a fourth frequency, where the third frequency is less than the first frequency, and the fourth frequency is less than or equal to the third frequency and is greater than 0.

In the foregoing embodiment, the application program is allowed to perform the drawing operation at a frequency that does not exceed a specific value. This reduces the frequency of performing the drawing operation, and further reduces occupation of system resources by the background application, and heat generation and power consumption of the electronic device.

With reference to some embodiments of the second aspect, in some embodiments, when the first application program receives a first vertical synchronization signal, the electronic device determines whether a time difference between a time when the first application program receives the first vertical synchronization signal and a time when the first application program performs the drawing operation last time is less than a reciprocal of the fourth frequency. If the time difference is less than the reciprocal, the electronic device intercepts a first drawing operation, where the first drawing operation is a drawing operation performed by the first application program in response to the first vertical synchronization signal. If the time difference is not less than the reciprocal, the electronic device performs the first drawing operation.

In the foregoing embodiment, when the application program performs the drawing operation for a purpose of not refreshing an interface, the application program is allowed to perform the drawing operation at a frequency that does not exceed a specific value. This reduces the frequency of performing the drawing operation, and further reduces occupation of system resources by the background application, and heat generation and power consumption of the electronic device.

With reference to some embodiments of the second aspect, in some embodiments, the electronic device determines the second frequency according to a drawing frequency limiting policy and the first application program.

In the foregoing embodiment, the electronic device may determine, according to the drawing frequency limiting policy, frequencies of performing drawing operations by different application programs. This helps implement differentiated allocation of system resources at the same time, and reduces heat generation and power consumption of the electronic device.

With reference to some embodiments of the second aspect, in some embodiments, the electronic device determines, based on an activity manager service and/or a cpuset parameter of a process of the first application program, whether the electronic device displays the interface of the first application program or whether the first application program is the foreground application or the background application.

In the foregoing embodiment, it can be determined, based on the activity manager service and/or the cpuset parameter of the process of the application program, whether the application program is switched from the foreground application to the background application, to improve recognition accuracy of the background application, more accurately reduce the frequency at which the background application performs the drawing operation, and further reduce heat generation and power consumption of the electronic device.

With reference to some embodiments of the second aspect, in some embodiments, N is equal to 0.

In the foregoing embodiment, when the application program is the background application, the electronic device may indicate the application program not to perform the drawing operation, so that the application program releases a system resource, to reduce heat generation and power consumption of the electronic device.

With reference to some embodiments of the second aspect, in some embodiments, N is equal to K.

In the foregoing embodiment, when the application program is the background application, each time when/after the application program receives a vertical synchronization signal, the animation event tasks saved by the application program may be deleted, so that all drawing operations performed by the application program are null operations, to release more system resources, and further reduce heat generation and power consumption of the electronic device.

According to a third aspect, an embodiment of this application provides an electronic device. The electronic device includes: one or more processors and a memory, where the memory is coupled to the one or more processors, the memory is configured to store computer program code, the computer program code includes computer instructions, and the one or more processors invoke the computer instructions, so that the electronic device performs the following operations:

starting a first application program; performing a drawing operation at a first frequency when the first application program is a foreground application, where the drawing operation is for drawing a view for the first application program; and performing the drawing operation at a second frequency after the first application program is switched from the foreground application to a background application, where the second frequency is less than the first frequency, and the first frequency is a frequency at which the first application program receives a vertical synchronization signal.

With reference to some embodiments of the third aspect, in some embodiments, after the first application program is switched from the foreground application to the background application, a choreographer of the first application program is indicated to respond to only N vertical synchronization signals in K received vertical synchronization signals, so that the electronic device performs the drawing operation at the second frequency, where K is a positive integer, and N is a positive integer less than K.

With reference to some embodiments of the third aspect, in some embodiments, after the first application program is switched from the foreground application to the background application, a choreographer of the first application program is indicated to process only animation event tasks corresponding to N vertical synchronization signals in K received vertical synchronization signals, so that the electronic device performs the drawing operation at the second frequency, where N is a positive integer less than K.

With reference to some embodiments of the third aspect, in some embodiments, after the first application program is switched from the foreground application to the background application, animation event tasks corresponding to K-N vertical synchronization signals in K vertical synchronization signals received by a choreographer of the first application program are deleted, so that the electronic device performs the drawing operation at the second frequency, where K is a positive integer, and N is a positive integer less than K.

With reference to some embodiments of the third aspect, a ratio of N to K corresponds to a ratio of the second frequency to the first frequency.

With reference to some embodiments of the third aspect, the ratio of N to K is equal to the ratio of the second frequency to the first frequency.

With reference to some embodiments of the third aspect, in some embodiments, after the first application program is switched from the foreground application to the background application, when the application program does not receive vertical synchronization signals at the first frequency, but receives vertical synchronization signals at a third frequency, the electronic device performs the drawing operation at a frequency lower than a fourth frequency, where the third frequency is less than the first frequency, and the fourth frequency is less than or equal to the third frequency and is greater than 0.

With reference to some embodiments of the third aspect, in some embodiments, when the first application program receives a first vertical synchronization signal, the electronic device determines whether a time difference between a time when the first application program receives the first vertical synchronization signal and a time when the first application program performs the drawing operation last time is less than a reciprocal of the fourth frequency. If the time difference is less than the reciprocal, the electronic device intercepts a first drawing operation, where the first drawing operation is a drawing operation performed by the first application program in response to the first vertical synchronization signal. If the time difference is not less than the reciprocal, the electronic device performs the first drawing operation.

With reference to some embodiments of the third aspect, in some embodiments the second frequency is determined according to a drawing frequency limiting policy and the first application program.

With reference to some embodiments of the third aspect, in some embodiments, based on an activity manager service and/or a cpuset parameter of a process of the first application program, it is determined that the first application program is the foreground application or the background application.

With reference to some embodiments of the third aspect, in some embodiments, N is equal to 0.

With reference to some embodiments of the third aspect, in some embodiments, N is equal to K.

According to a fourth aspect, an embodiment of this application provides an electronic device. The electronic device includes: one or more processors and a memory, where the memory is coupled to the one or more processors, the memory is configured to store computer program code, the computer program code includes computer instructions, and the one or more processors invoke the computer instructions, so that the electronic device performs the following operations:

starting a first application program; displaying, by the electronic device, an interface of the first application program, and performing a drawing operation at a first frequency, where the drawing operation is for drawing a view for the first application program; and closing display of the interface of the first application program, and performing the drawing operation at a second frequency, where the second frequency is less than the first frequency, and the first frequency is a frequency at which the first application program receives a vertical synchronization signal.

With reference to some embodiments of the fourth aspect, display of the interface of the first application program is closed, where the first application program is a background application.

With reference to some embodiments of the fourth aspect, in some embodiments, when the electronic device does not display the interface of the first application program, a choreographer of the first application program is indicated to respond to only N vertical synchronization signals in K received vertical synchronization signals, so that the electronic device performs the drawing operation at the second frequency, where K is a positive integer, and N is a positive integer less than K.

With reference to some embodiments of the fourth aspect, in some embodiments, when the electronic device does not display the interface of the first application program, a choreographer of the first application program is indicated to process only animation event tasks corresponding to N vertical synchronization signals in K received vertical synchronization signals, so that the electronic device performs the drawing operation at the second frequency, where K is a positive integer, and N is a positive integer less than K.

With reference to some embodiments of the fourth aspect, in some embodiments, when the electronic device does not display the interface of the first application program, the drawing operation is performed at the second frequency, and the electronic device deletes animation event tasks corresponding to K-N vertical synchronization signals in K vertical synchronization signals received by a choreographer of the first application program, so that the electronic device performs the drawing operation at the second frequency, where K is a positive integer, and N is a positive integer less than K.

With reference to some embodiments of the fourth aspect, in some embodiments, a ratio of N to K corresponds to a ratio of the second frequency to the first frequency.

With reference to some embodiments of the fourth aspect, in some embodiments, the ratio of N to K is equal to the ratio of the second frequency to the first frequency.

With reference to some embodiments of the fourth aspect, in some embodiments, after display of the interface of the first application program is closed, when the application program does not receive vertical synchronization signals at the first frequency, but receives vertical synchronization signals at a third frequency, the electronic device performs the drawing operation at a frequency lower than a fourth frequency, where the third frequency is less than the first frequency, and the fourth frequency is less than or equal to the third frequency and is greater than 0.

With reference to some embodiments of the fourth aspect, in some embodiments, when the first application program receives a first vertical synchronization signal, the electronic device determines whether a time difference between a time when the first application program receives the first vertical synchronization signal and a time when the first application program performs the drawing operation last time is less than a reciprocal of the fourth frequency. If the time difference is less than the reciprocal, the electronic device intercepts a first drawing operation, where the first drawing operation is a drawing operation performed by the first application program in response to the first vertical synchronization signal. If the time difference is not less than the reciprocal, the electronic device performs the first drawing operation.

With reference to some embodiments of the fourth aspect, in some embodiments the second frequency is determined according to a drawing frequency limiting policy and the first application program.

With reference to some embodiments of the fourth aspect, in some embodiments, based on an activity manager service and/or a cpuset parameter of a process of the first application program, it is determined whether the electronic device displays the interface of the first application program or whether the first application program is the foreground application or the background application.

With reference to some embodiments of the fourth aspect, in some embodiments, N is equal to 0.

With reference to some embodiments of the fourth aspect, in some embodiments, N is equal to K.

According to a fifth aspect, an embodiment of this application provides a chip system. The chip system is applied to an electronic device. The chip system includes one or more processors. The processor is configured to invoke computer instructions, so that the electronic device performs the method described in the first aspect or any possible implementation of the first aspect, or the method described in the second aspect or any possible implementation of the second aspect.

According to a sixth aspect, an embodiment of this application provides a computer program product including instructions. When the computer program product runs on an electronic device, the electronic device is enabled to perform the method described in the first aspect or any possible implementation of the first aspect, or the method described in the second aspect or any possible implementation of the second aspect.

According to a seventh aspect, an embodiment of this application provides a computer-readable storage medium including instructions. When the instructions are run on an electronic device, the electronic device is enabled to perform the method described in the first aspect or any possible implementation of the first aspect, or the method described in the second aspect or any possible implementation of the second aspect.

It may be understood that the electronic device provided in the third aspect or the fourth aspect, the chip system provided in the fifth aspect, the computer program product provided in the sixth aspect, and the computer storage medium provided in the seventh aspect are all configured to perform the method provided in embodiments of this application. Therefore, for beneficial effects that can be achieved, refer to beneficial effects in the corresponding method. Details are not described herein again.

DETAILED DESCRIPTION OF ILLUSTRATIVE EMBODIMENTS

Figure 1A:
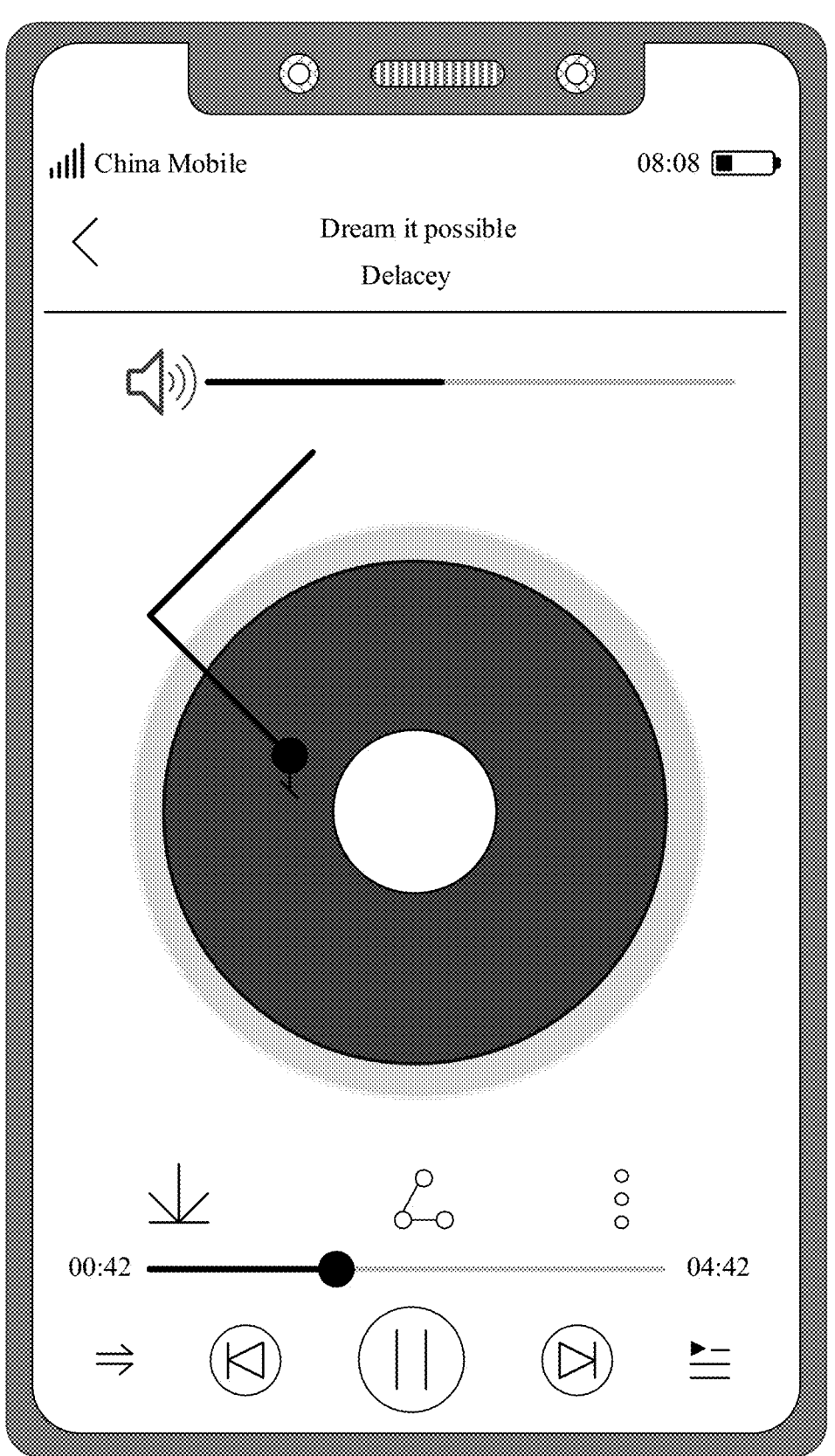
FIG. 1(A) to FIG. 1(F) are schematic diagrams of examples of conversion between a foreground application and a background application in this application.
Figure 1B:
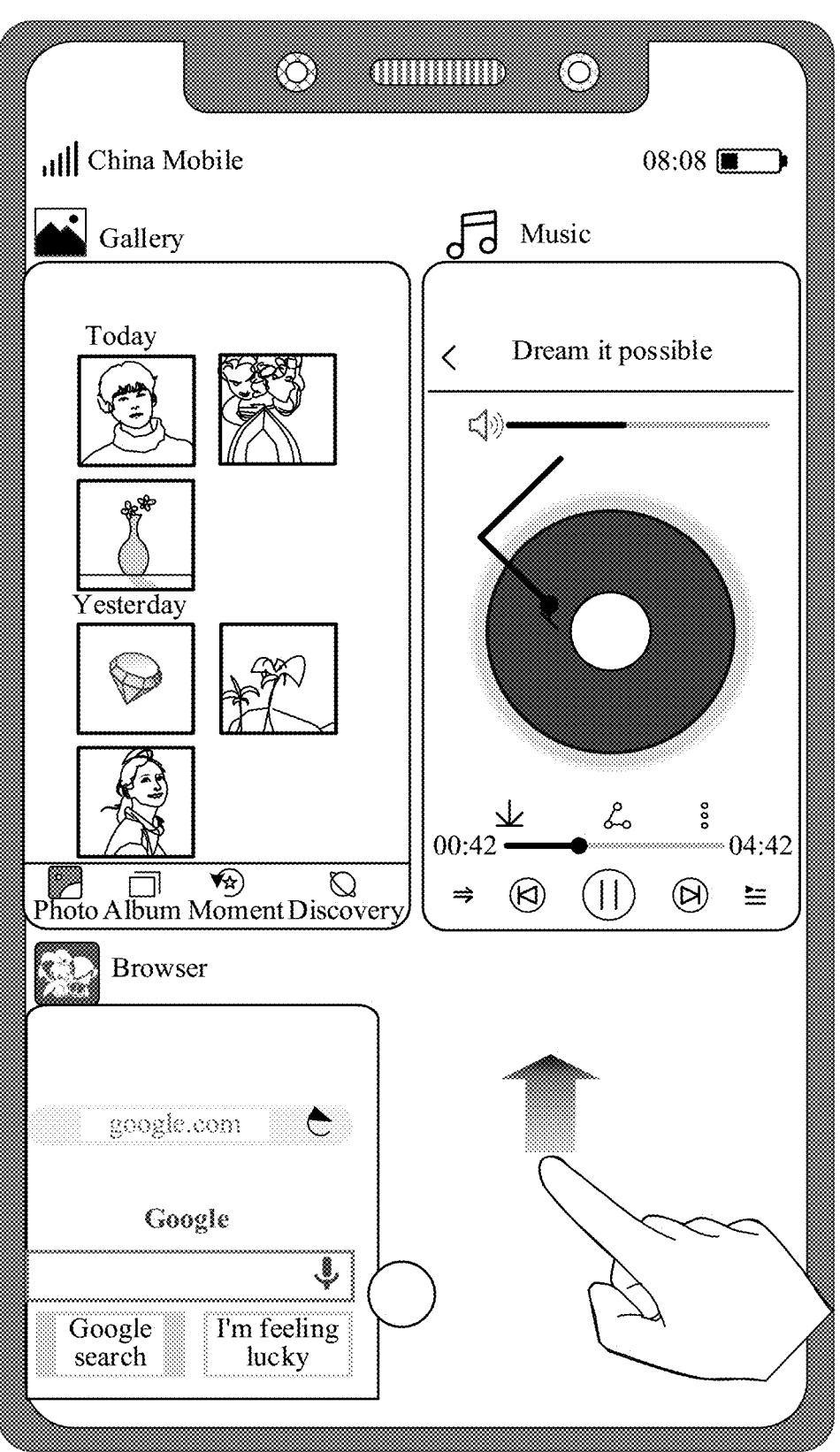

Terms used in the following embodiments of this application are merely intended to describe specific embodiments, but are not intended to limit this application. As used in the specification and appended claims of this application, terms "a", "one", "the", "the foregoing", "this" and "the one" of singular forms are intended to also include plural forms, unless otherwise clearly specified in the context. It should also be understood that the term "and/or" as used in this application refers to and includes any or all possible combinations of one or more of the listed items.

The following terms "first" and "second" are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

For ease of understanding, the following first describes related terms and related concepts in embodiments of this application. Terms used in the Description of Embodiments of the present invention are merely used to explain specific embodiments of the present invention, but are not intended to limit the present invention.

(1) Foreground Application and Background Application

Depending on whether an application program can directly interact with a user, application programs may be classified into the following types: foreground applications and background applications. A foreground application and a background application describe a running status of an application program. A foreground application is an application program that is placed by the user in the foreground and that can directly interact with each other, and a background application is an application program that is placed by the user in the background and that cannot directly interact with each other.

In embodiments of this application, whether an application is a foreground application or a background application can be determined based on whether the application program is directly visible. Specifically, when an application program is visible, it is a foreground application; and when an application program is invisible, it is a background application.

For example, when an interface of an application is displayed on a screen of an electronic device, the application is a foreground application. When an interface of an application is not displayed on the screen of the electronic device, the application is a background application. An interface of an application does not include a top status bar or a notification bar of an operating system.

Optionally, in some embodiments of this application, whether the application program is a foreground application or a background application may be determined based on whether the application meets some conditions. Specifically, if the application program meets any one of the following three conditions, the application program is a foreground application; otherwise, the application program is a background application. The three conditions are as follows: The application has a visible activity, the application has a foreground service, and another foreground application is associated with the application. For a concept of the activity, refer to a text description in term explanation (2) activity, and details are not described herein again.

The electronic device may determine whether an application has a visible activity at a moment in many manners, and further determine whether the application is a foreground application or a background application. This is not limited herein.

For example, whether the application program is a foreground application or a background application may be determined based on a life cycle of a main activity of the application program. Specifically, whether the application is a foreground application or a background application may be determined based on whether the main activity of the application program executes various methods such as an onStop method, an onResume method, and a topResumedActivityChangedItem method. After the activity of the application executes the onStop method, the application is considered as a background application. After the activity of the application executes the onResume method and the topResumedActivityChangedItem method, the application is considered as a foreground application. For concepts of the terms such as the onStop method, the onResume method, and the topResumedActivityChangedItem method, refer to the text description in (2) activity in the following term explanation. Details are not described herein again.

For example, whether the application program is a foreground application or a background application may be determined by using a cpuset parameter. Specifically, when a cpuset parameter of a process corresponding to the application program is background or key-background, the application program is a background application. Correspondingly, when the cpuset parameter of the process corresponding to the application program is not background or key-background, the application program is a foreground application.

It should be noted that, in response to an operation of the user, an application program may be converted between a foreground application and a background application.

It should be noted that, for the user, when the user can view an interface of an application program, the application is considered as a foreground application. When the user does not view the interface of the application program, the application is considered as a background application.

The following uses content shown in FIG. 1(A) to FIG. 1(F) as an example to describe how to determine whether an application program is a foreground application or a background application based on whether a device displays an interface of the application program.

FIG. 1(A) to FIG. 1(F) are schematic diagrams of examples of conversion between a foreground application and a background application in this application.

Figure 1C:
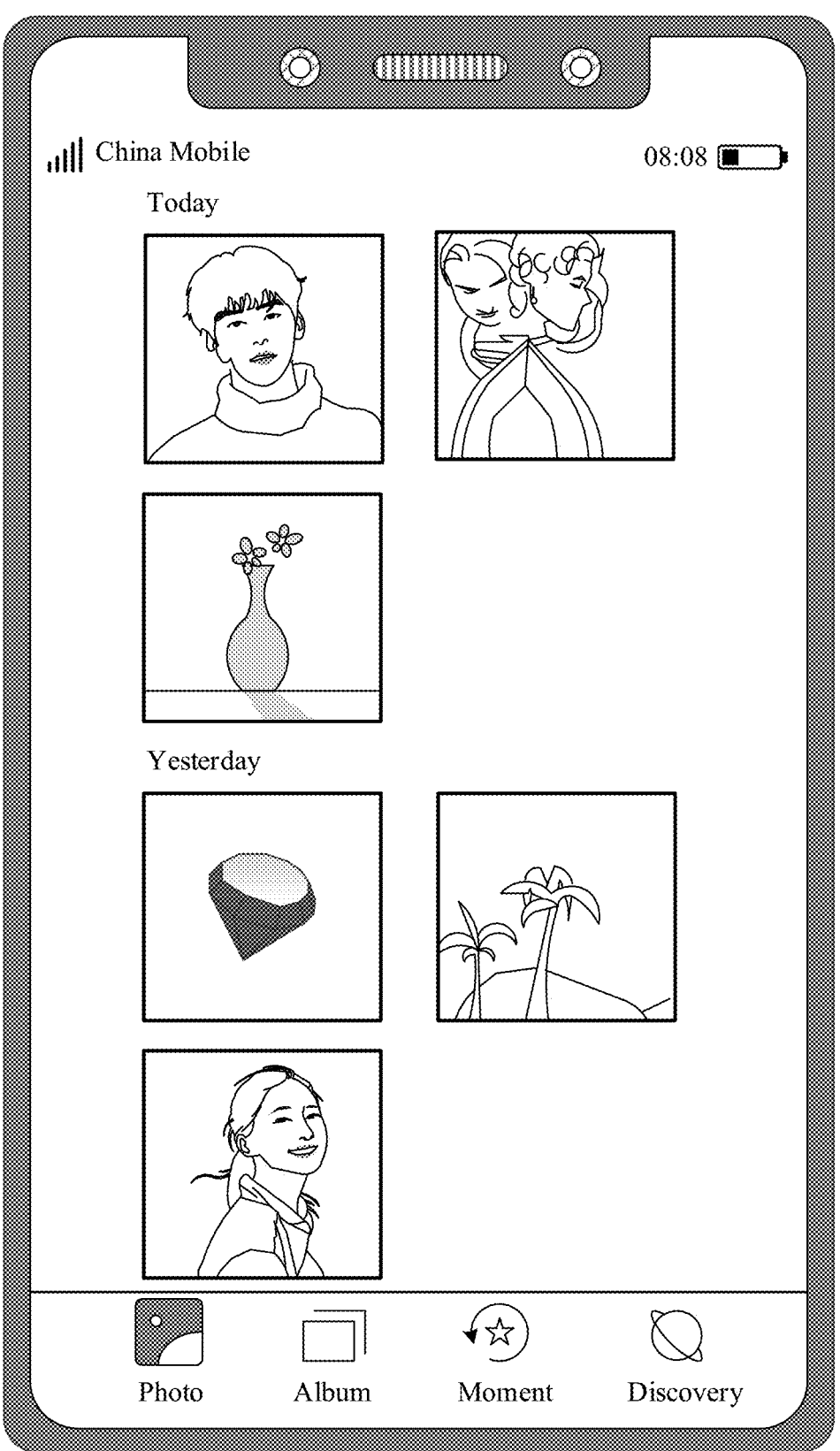
Figure 1D:
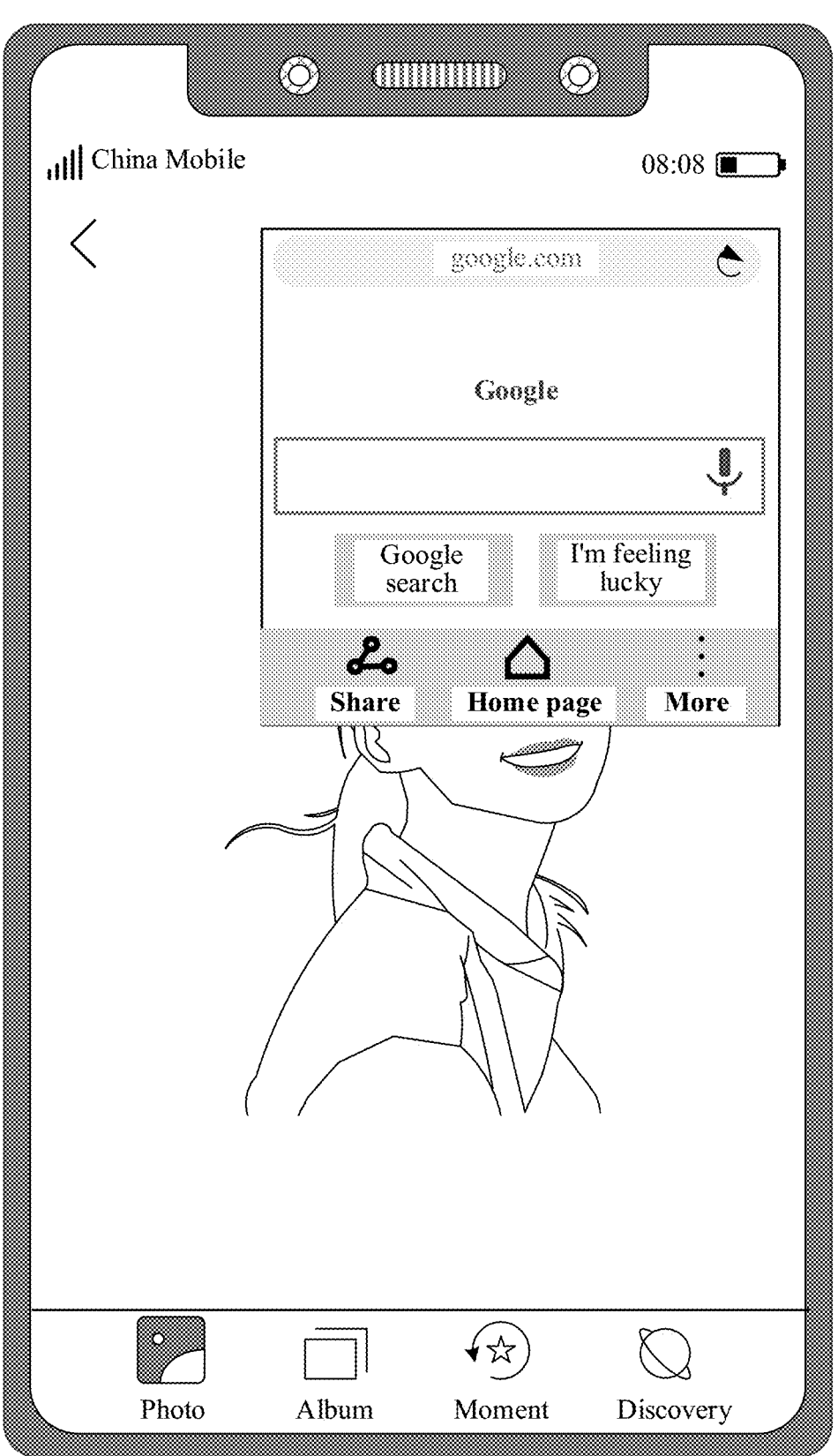

As shown in FIG. 1(A), when a current user starts Music to listen to music, an interface displayed on a mobile phone is an interface of Music. In this case, Music is a foreground application. With reference to content shown in FIG. 1(B), it may be learned that the user may open a multi-task bar, and see that three application programs currently run on the mobile phone: Music, Gallery, and Browser. In the scenario shown in FIG. 1(A), the electronic device does not display interfaces of Gallery and Browser. In this case, Gallery and Browser are background applications. As shown in FIG. 1(C), in response to an operation of the user, the user switches Music to the background and switches Gallery to the foreground, and the electronic device displays the interface of Gallery. In this case, Gallery is a foreground application, and Music and Browser are background applications. As shown in FIG. 1(D), in response to an operation of the user, the user may open a small window of Browser based on FIG. 1(C) to browse a web page and a photo at the same time, and the mobile phone displays the interfaces of Browser and Gallery at the same time. In this case, Gallery and Browser are foreground applications, and Music is a background application.

Figure 1E:
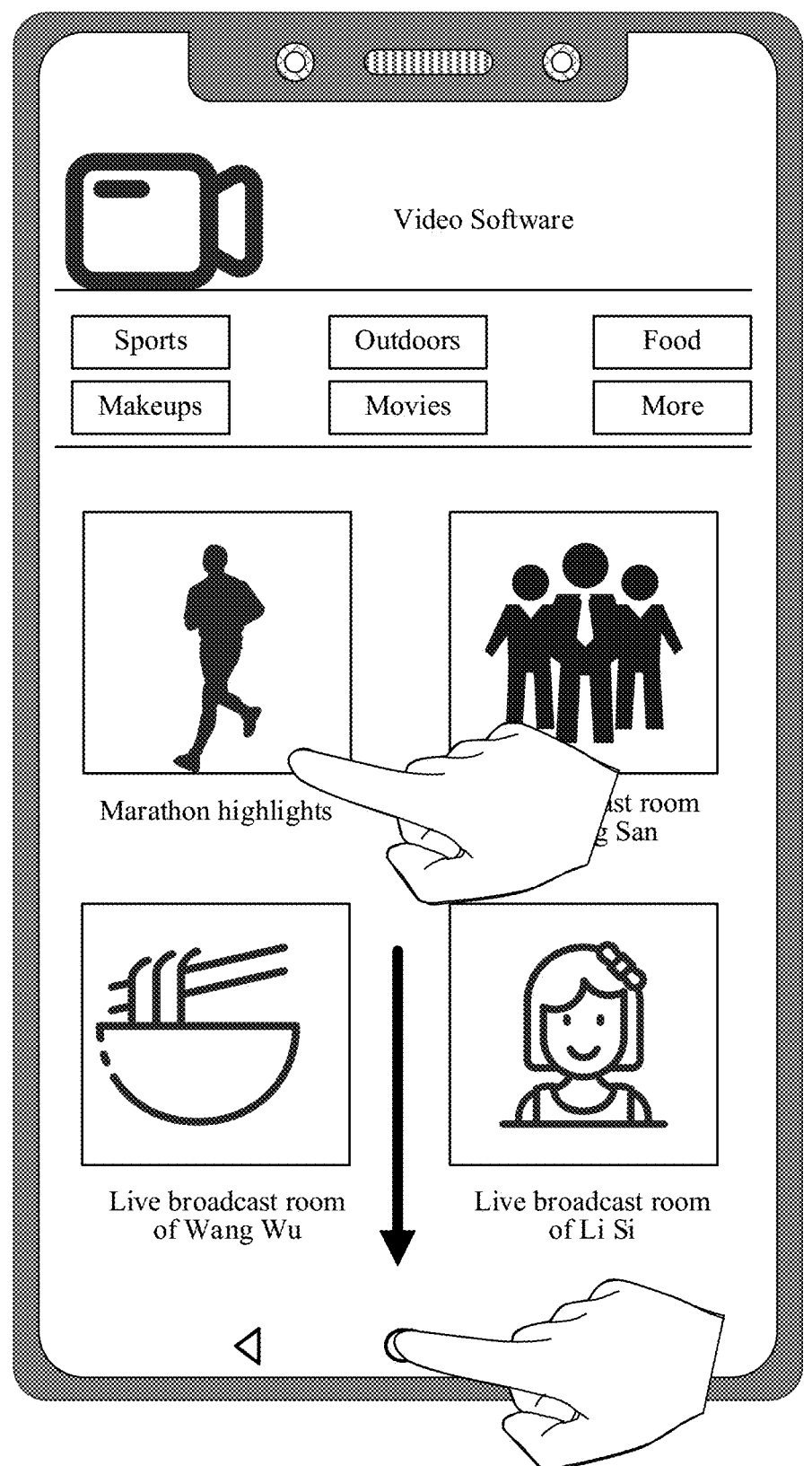
Figure 1F:
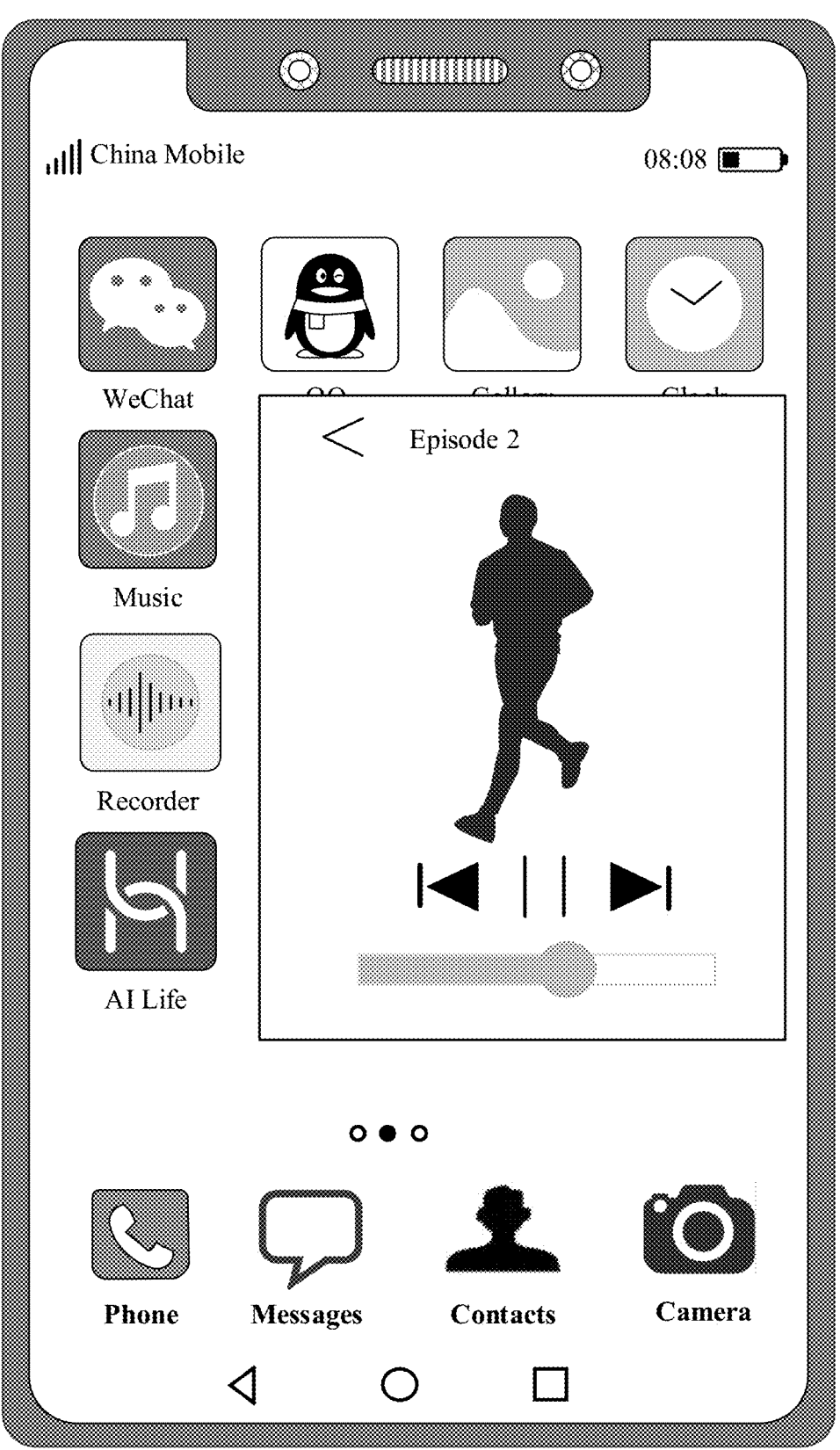

As shown in FIG. 1(E), when the user opens a video application, the user may switch the application to the background after enabling a small windowed mode. As shown in FIG. 1(F), the electronic device displays a desktop and the small window of the video application. In this case, the video application is a foreground application.

It should be noted that, in this embodiment of this application, when a main interface of an application is switched to the background by the user, but the device still displays a small window interface of the application (the main interface or another interface of the application), the application is considered as a foreground application.

It should be noted that, in some embodiments of this application, when the electronic device closes display of some interfaces of an application program, it is considered that the electronic device does not close interface display of the application program. Correspondingly, when the electronic device closes display of all interfaces of the application program, it is considered that the electronic device closes interface display of the application program.

In the scenario shown in FIG. 1(A), the user may see interface of Music displayed by the electronic device. Therefore, Music is a foreground application. In the scenario shown in FIG. 1(B), the user may see the interface of Gallery displayed by the electronic device. Therefore, Gallery is a foreground application. In the scenario shown in FIG. 1(D), the user may see the interfaces of Gallery and Browser that are displayed by the electronic device. Therefore, Gallery and Browser are foreground applications. In the scenarios shown in FIG. 1(E) and FIG. 1(F), the user may see the interface of the video software displayed by the electronic device. Therefore, the video software is a foreground application.

(2) Activity

The activity is one of basic components of an Android operating system and can be used to provide an interactive interface or view for a user in an application program. One application program may have a plurality of activities, and the application loads the activities by using a task stack. An activity at a top of the task stack is an activity that the user can directly interact with.

An activity has a life cycle. A life cycle of a main activity of an application program is determined to determine whether the application is a foreground application or a background application. The main activity is an activity specified by a developer when developing the application, and may be used to bear a main interface of the application program.

Figure 2:
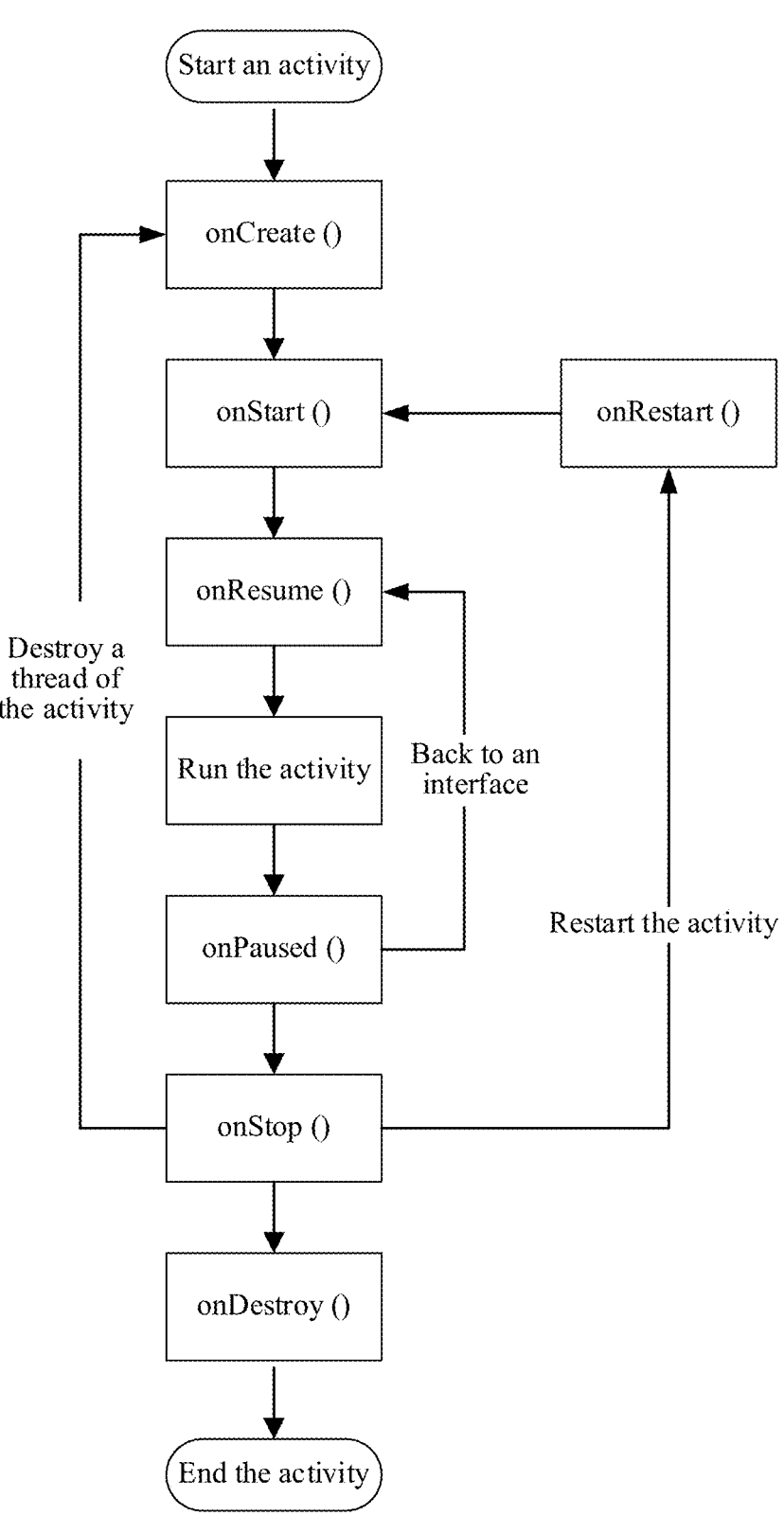
FIG. 2 is a schematic diagram of an example of a life cycle of an activity in this application.

FIG. 2 is a schematic diagram of an example of a life cycle of an activity in this application.

As shown in FIG. 2, a developer of an application program needs to implement at least seven callback methods when developing an activity of the application program. The callback method may also be referred to as a callback function, and may be invoked to implement a specific function. The seven callback methods are as follows: an onCreate callback method, an onStart callback method, an onResume callback method, an onPause callback method, an onStop callback method, an onDestroy callback method, and an onRestart callback method. The activity can implement a life cycle of the activity by invoking the foregoing seven callback methods.

Specifically, when the activity is created for the first time, the activity invokes the onCreate callback method to initialize the activity. When the activity changes from invisible to visible, the activity invokes the onStart callback method. When the activity is ready to interact with the user, the activity invokes the onResume callback method. When the activity leaves a top of a task stack, the activity invokes the onPause callback method to save some key data and release some resources. When the activity becomes completely invisible, the activity invokes the onStop callback method. Before the activity destroys itself, the activity invokes the onDestroy callback method to release resources. When the activity changes from a stopped state to a running state, the activity calls the onRestart callback method.

With reference to the life cycle of the activity, it may be determined whether the application program to which the activity belongs is a foreground application or a background application. After a main activity of the application executes the onStop callback method, it may be considered that the application becomes a background application. Correspondingly, after the main activity of the application executes the onResume callback method, it may be considered that the application becomes a foreground application.

It should be noted that, in some cases, when an application program resumes the foreground, a main activity of the application program executes a TopResumedActivity-ChangeItem callback method. Therefore, it can be determined whether the main activity of the application program has executed the TopResumedActivityChangeItem callback method, to determine whether the current application becomes a foreground application.

In embodiments of this application, a life cycle of a main activity of a currently running application program can be monitored by using an activity manager service (AMS)

provided by an operating system, and then whether any application program is currently a foreground application or a background application is determined by using the activity manager service.

Optionally, in some embodiments of this application, when developing the application program, the developer of the application program may add an interface to the life cycle of the main activity, to transfer information to a choreographer or another module or object of the application program and determine whether the application program is a foreground application or a background application.

(3) Choreographer and Drawing Operation

A choreographer is a class in an operating system, and is for requesting a vertical synchronization signal and performing a drawing operation in response to the requested vertical synchronization signal. A class is a data structure that defines a status and behavior of an object. The vertical synchronization signal is a signal provided by the operating system for coordinating and synchronizing a choreographer operation and a SurfaceFlinger operation.

When the application program is started, the choreographer is initialized. The process of initializing the choreographer includes: The activity generates an instantiated choreographer object based on the choreographer class. The choreographer may perform the drawing operation. The drawing operation may include: The choreographer handles input event tasks, animation event tasks, layout event tasks, and submission event tasks. After performing the drawing operation, the choreographer may submit a result of the drawing operation to another module of the application program, to display a refreshed interface or view on the screen of the electronic device.

The following describes in detail generation of the choreographer and a trigger condition for the choreographer to perform the drawing operation.

After each application program is started by the user, when the application program needs to display a visual interface or view for the first time, at least one choreographer belonging to the application program is generated. A quantity of choreographers may be related to a quantity of threads used by the application program. The thread is a minimum resource scheduled by the operating system. For example, a UI thread of the application program generates a choreographer bound to the thread. The UI thread may also be referred to as a main thread, and is mainly used to bear computing overheads for implementing functions such as interface display, update, and control interaction.

When the application program needs to refresh the interface or the view, the choreographer requests a vertical synchronization signal (Vsync) from a SurfaceFlinger to find the right time to perform the drawing operation. After receiving the vertical synchronization signal sent by the SurfaceFlinger, the choreographer begins to perform the drawing operation. The choreographer uses an OnVsync callback method to receive the vertical synchronization signal. The OnVsync callback method is a callback method provided by an internal class FrameDisplayEventReceiver of the choreographer. After the choreographer successfully receives the vertical synchronization signal by using the OnVsync callback method, the choreographer is notified that the drawing operation can begin.

When the application program is a foreground application/background application, a frequency at which the choreographer requests the vertical synchronization signal from the SurfaceFlinger remains unchanged.

The SurfaceFlinger is a service provided by a bottom layer of the operating system, and is configured to receive requests of choreographers of different application programs, and distribute vertical synchronization signals to the application programs in response to the requests. The vertical synchronization signal may be generated through software simulation, or may be generated by hardware of the electronic device. For example, the vertical synchronization signal may be generated by a hardware composer (HWC). After generating the vertical synchronization signal, the HWC may send the vertical synchronization signal to the SurfaceFlinger by using the callback method. Therefore, the SurfaceFlinger can forward the vertical synchronization signal to the choreographer. After receiving the vertical synchronization signal sent by the SurfaceFlinger, the choreographer begins to perform the drawing operation.

A frequency at which the electronic device generates the vertical synchronization signal may be related to a refresh rate of the screen of the electronic device. For example, when the frequency at which the electronic device generates the vertical synchronization signal is 90 Hz, the refresh rate of the screen of the electronic device may be 90 Hz.

The following describes content included in the drawing operation.

Specifically, after the choreographer is generated, the application program saves four event tasks to four one-way linked lists (CallbackQueue) configured in the choreographer in chronological order. After receiving the vertical synchronization signal, the choreographer uses a doFrame callback method to process four corresponding event tasks corresponding at the current time. The four event tasks are CALLBACK_INPUT, CALLBACK_ANIMATION, CALLBACK_TRAVERSAL, and CALLBACK_COMMIT.

The doFrame callback method includes four doCallBacks callback methods that are respectively used to process the foregoing four event tasks.

CALLBACK_INPUT is an input event task, and the input event task is data for the application program to encapsulate and distribute an input event to the choreographer. The input event may be an interaction between the user and the application program that is received by the application program. For example, the input event may be user tap on an interactive control in the application program, or user swipe (for example, swiping up and down, sliding left and right) in the application program, or voice input of the user. This is not limited herein. After determining the input event, the application program preliminarily processes the input event, generates an input event task corresponding to the input event, and transfers the input event task to the choreographer.

CALLBACK_ANIMATION is an animation event task, and the animation event task is data required by the application program to calculate animation. The animation may include: view animation, frame animation (Drawable Animation), property animation, and the like.

CALLBACK_TRAVERSAL is a layout event task and is used by the choreographer to calculate drawing data of the view or the interface. The calculated and determined drawing data is submitted to another module of the application program to determine a width, a height, a position, a shape, and the like of content displayed in the view.

CALLBACK_COMMIT is a submission event task, and indicates that the choreographer completes a drawing operation corresponding to a vertical synchronization signal.

Figure 3:
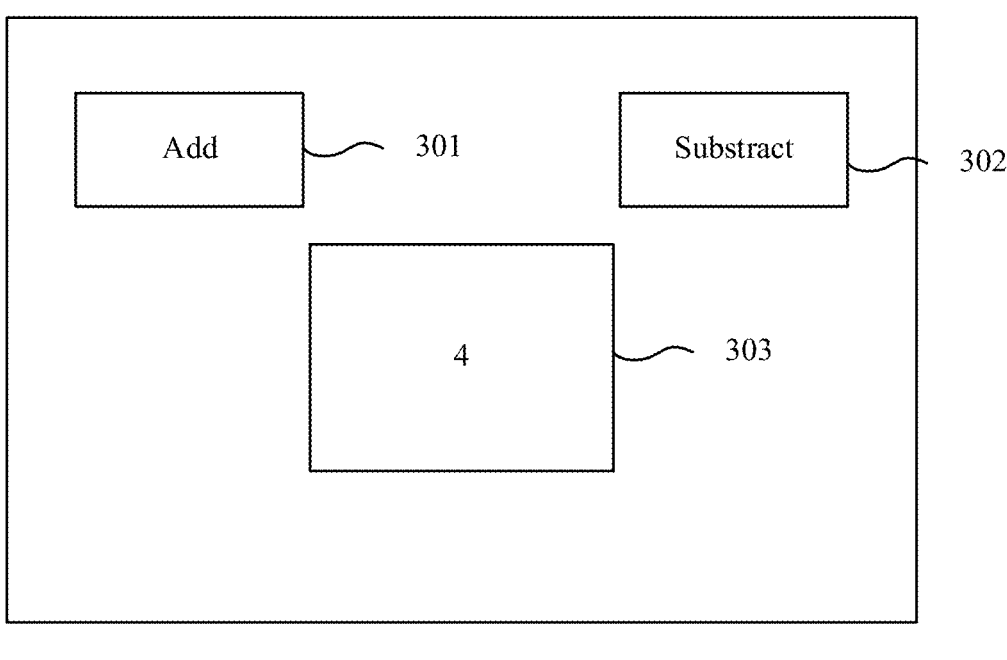
FIG. 3 is a schematic diagram of an example of four event tasks in this application.
Figure 3:
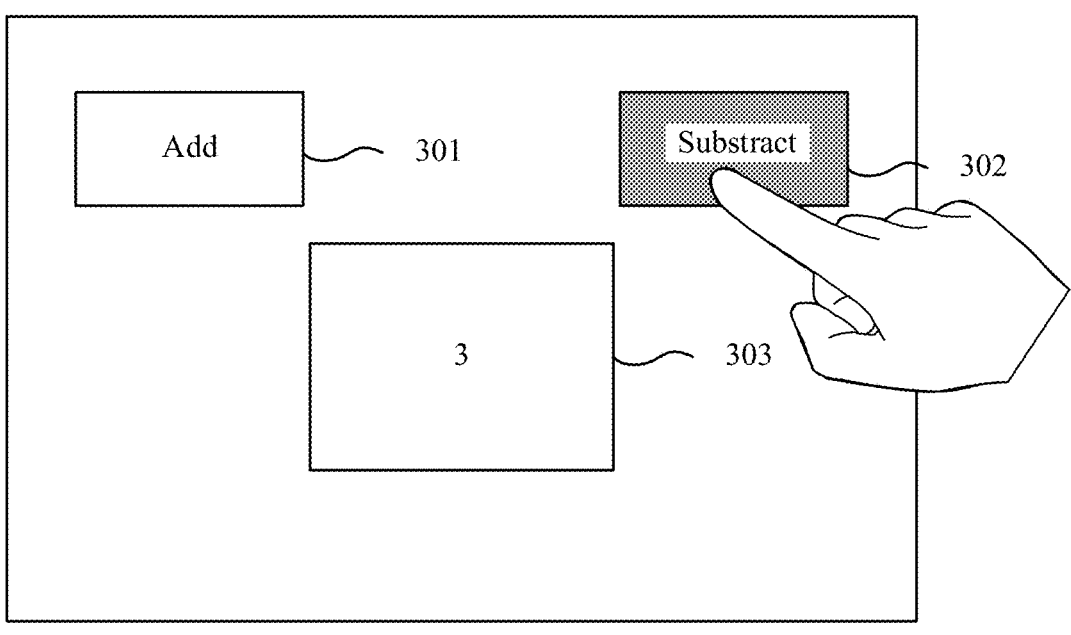

The following uses content shown in FIG. 3 as an example to specifically describe the foregoing four event tasks again.

FIG. 3 is a schematic diagram of an example of four event tasks in this application.

A main interface of an application program is shown in (A) in FIG. 3, where the main interface includes three rectangular controls: a No. 1 rectangular control 301, a No. 2 rectangular control 302, and a No. 3 rectangular control 303. The No. 1 rectangular control 301 and the No. 2 rectangular control 302 may correspond to tap operations of the user, and the No. 3 rectangular control 303 may display a current number to the user. When the user taps the No. 1 rectangular control 301, the number displayed on the No. 3 rectangular control 303 increases by 1. When the user taps the No. 2 rectangular control 302, the number displayed by the No. 3 rectangular control 303 decreases by 1. In addition, when the user taps the No. 1 rectangular control 301 or the No. 2 rectangular control 302, the rectangular control tapped by the user presents a gradual gray animation to notify the user that the tap succeeds.

Content shown in (B) in FIG. 3 is an interface displayed after the user taps the No. 2 rectangular control 302. Compared with the interface of the application program shown in (A) in FIG. 3, the No. 2 rectangular control 302 turns gray, and the number displayed on the No. 3 rectangular control 303 changes from 4 to 3.

In the content shown in FIG. 3, it may be considered that the tap event for the No. 1 rectangular control 301 or the No. 2 rectangular control 302 is an input event. After obtaining the input event, the screen of the electronic device reports the input event to a corresponding driver, and distributes the input event to the corresponding application program. After obtaining the input event, the application program packages the event into an input event task and distributes the task to the choreographer. Similarly, the gradient gray animation that needs to be displayed is an animation event, and is packaged as an animation event task and distributed to the choreographer. Similarly, a layout event task is used to determine a position, a size, and a shape of the No. 2 rectangular control 302 in the view. Similarly, a submission event task is used to determine completion of a drawing operation.

Figure 4:
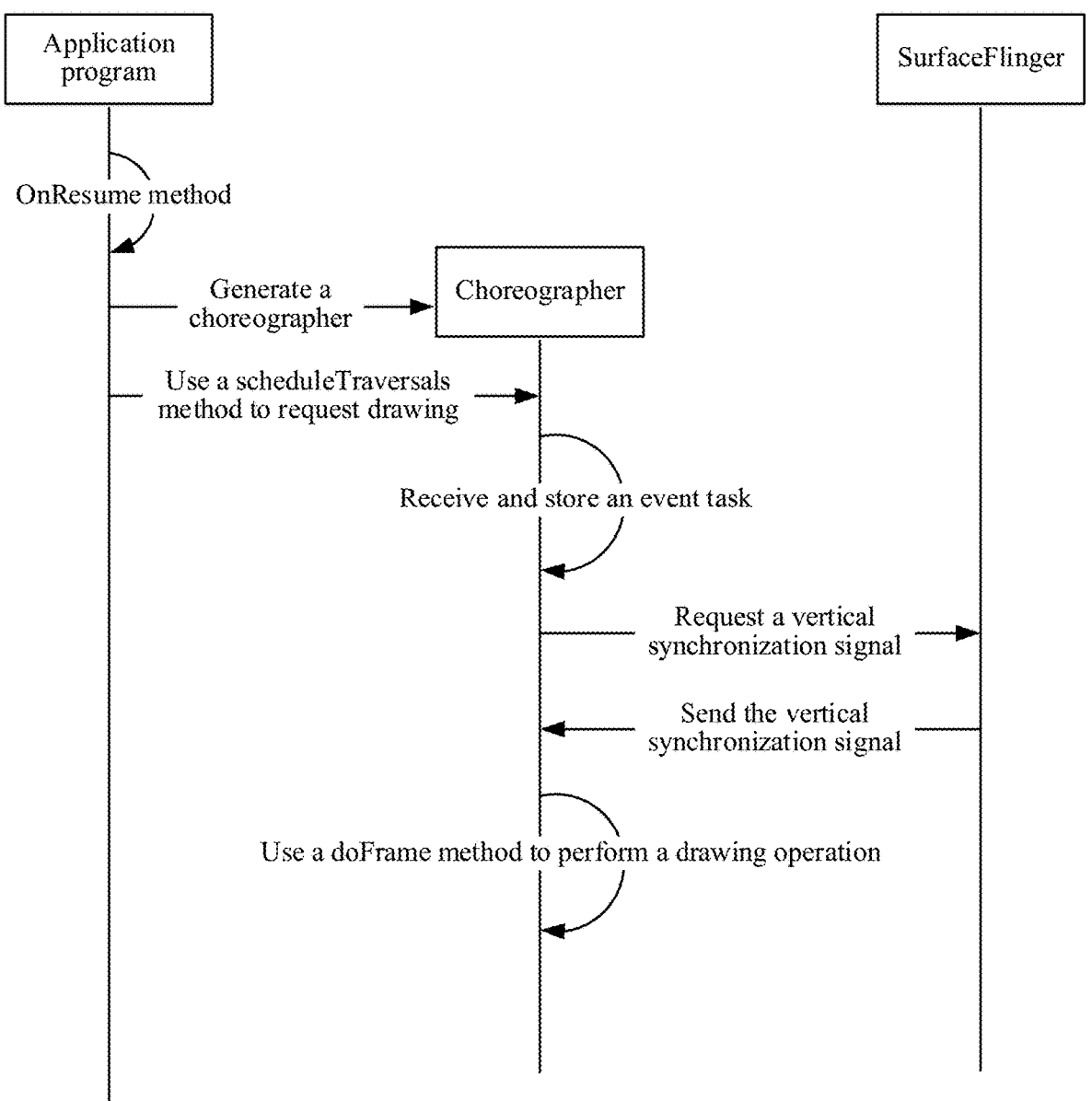
FIG. 4 is a schematic diagram of an example in which a choreographer performs a drawing operation according to this application.

Finally, the following uses content shown in FIG. 4 as an example to describe a data process in which a choreographer performs a drawing operation.

FIG. 4 is a schematic diagram of an example in which a choreographer performs a drawing operation according to this application.

As shown in FIG. 4, after an application program is started for the first time, a main activity of the application program executes callback methods such as the onStart callback method and the onResume callback method based on a life cycle of the activity. After the application program executes the onResume callback method, if a visual interface or view needs to be displayed, an Activity.makeVisible callback method may be used to draw the interface or the view. While the activity draws the interface or the view by using the Activity.makeVisible callback method, the choreographer is initialized.

After the choreographer is initialized, when the application program needs to refresh the view, a scheduleTraversals callback method is used to send a drawing request to the choreographer. The choreographer woken up by the scheduleTraversals callback method continuously receives event tasks in chronological order and uses different one-way linked lists to store the corresponding event tasks.

In addition, after receiving the drawing request, the choreographer requests a vertical synchronization signal from the SurfaceFlinger. After receiving the vertical synchronization signal sent by the SurfaceFlinger, the choreographer may perform a drawing operation by using the doFrame callback method. To be specific, an input event task, an animation event task, a layout event task, and a submission event task are processed by using the doFrame callback method.

The following describes scenarios involved in this application.

The operating system does not provide a callback method to determine whether the application that requests the vertical synchronization signal really needs to perform the drawing operation. After any application program requests the vertical synchronization signal from the SurfaceFlinger, the vertical synchronization signal is distributed. When using an electronic device such as a smartphone, the user may start a plurality of application programs. However, limited by a size of a screen of the electronic device, at a specific moment, the user can display only one or a few applications on the screen for interaction (for example, split-screen), and other application programs are converted into background applications. For any background application, because the background application is not destroyed and still holds a choreographer, when performing some operations in the background, the background application triggers the choreographer to perform a drawing operation.

First, because the background application has no view or interface that can be used to present to the user, a result of performing the drawing operation by the background application is not perceived by the user. Second, because only an animation event task is distributed to the choreographer of the background application, the background application actually processes only the animation event task when performing the drawing operation.

Based on the foregoing two points, it may be considered that the drawing operation performed by the background application is an invalid drawing operation.

It should be noted that, for any application program, when the application program is a foreground application, an input event task, an animation event task, a layout event task, and a submission event task are distributed to a choreographer of the application program. When the application program is a background application, because the application program does not provide an interface or a view that can interact with each other, an input event task, a layout event task, and a submission event task are not distributed to the application program.

It should be noted that, for the user, when the electronic device displays an interface of an application program, it is necessary for the application program to perform a drawing operation to refresh the interface. However, after the electronic device closes display of the interface of the application program and before the electronic device displays the interface of the application program again, a drawing operation performed by the application program to refresh the interface wastes resources of the operating system, and increases heat generation and power consumption of the electronic device.

Figure 5:
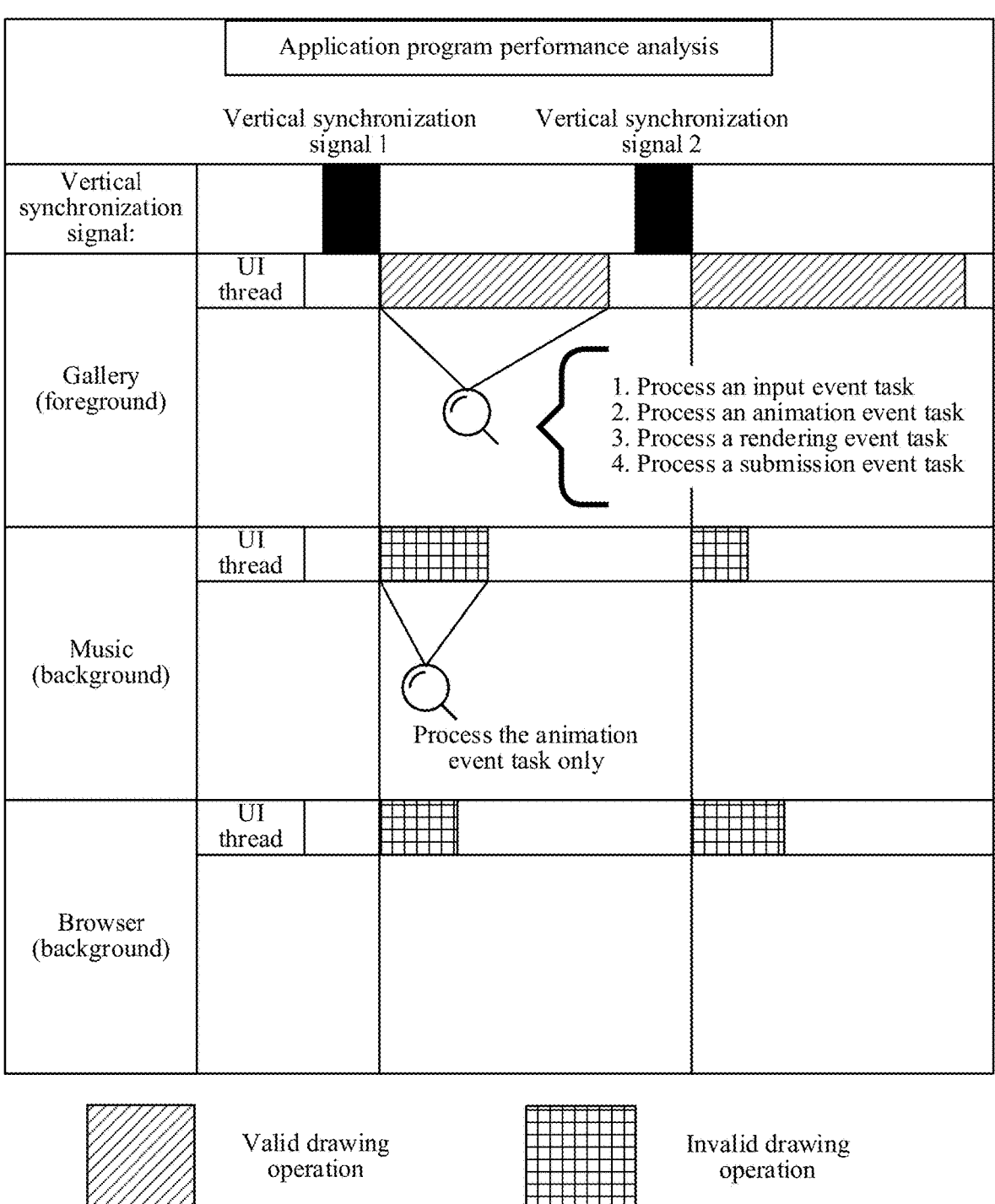
FIG. 5 is a schematic diagram of an example of performing a drawing operation by a foreground application and a background application in this application.

FIG. 5 is a schematic diagram of an example of performing a drawing operation by a foreground application and a background application in this application.

As shown in FIG. 5, a plurality of application programs run on an electronic device, including: Gallery, Music, and Browser. When Gallery is a foreground application, Music and Browser are background applications. Choreographers of Gallery, Music, and Browser each receive a vertical synchronization signal, and in response to the vertical synchronization signal, the choreographers of Gallery, Music, and Browser each perform a drawing operation. Computing resources of the drawing operation performed by the choreographer are provided by a UI thread.

It may be understood that, when the background application performs an invalid drawing operation, a system resource of the foreground application is occupied, and heat generation and power consumption of the electronic device are increased, thereby causing frame freezing of the electronic device and deteriorating user experience.

The following describes two system scheduling methods for a background application in this application.

With reference to the content shown in FIG. 5, after an application program is converted into a background application, because the application program still holds a choreographer, the choreographer of the application still receives a vertical synchronization signal sent by a SurfaceFlinger, and performs an invalid drawing operation. To reduce invalid drawing operations performed by background applications, there are two main system scheduling methods for background applications.

The first system scheduling method related to a background application is mainly to allocate system resources to a foreground application and a background application in a differentiated manner with reference to a hardware architecture feature of a CPU of the electronic device.

Figure 6:
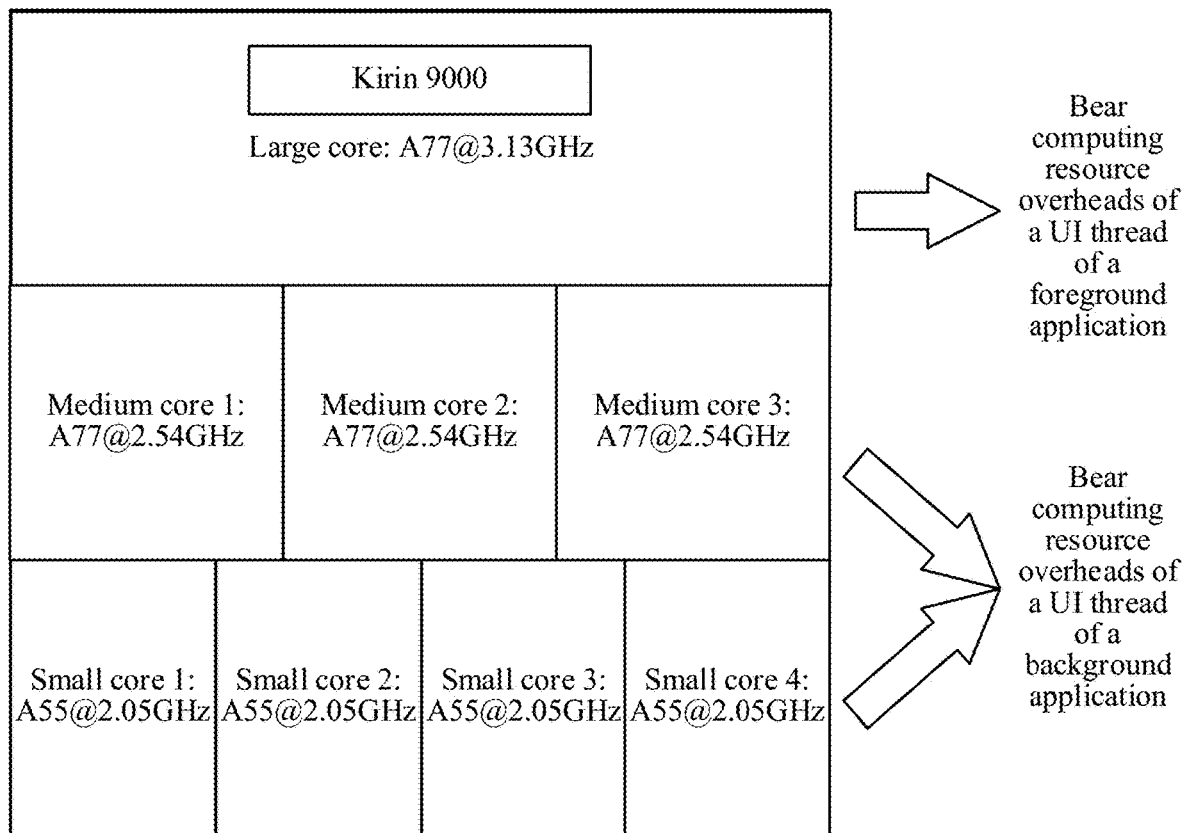
FIG. 6 is a schematic diagram of an example of a system scheduling method for a background application according to this application.

FIG. 6 is a schematic diagram of an example of a system scheduling method for a background application according to this application.

As shown in FIG. 6, a CPU Kirin 9000 is used as an example. The Kirin 9000 includes one large core of an A77 architecture, three medium cores of an A77 architecture, and four small cores of an A55 architecture. With reference to the hardware architecture feature of the CPU of the electronic device, when an application program is a foreground application, a large core is preferentially used to carry a computing resource of the application. When an application program is a background application, a medium core and a small core are preferentially used to carry a computing resource of the application.

It may be understood that when an application program performs a drawing operation, a computing resource of the CPU is consumed. Therefore, allocating system resources to a foreground application and a background application in the differentiated manner helps reduce occupation of computing resources of foreground applications by background applications. However, when the user starts a large quantity of applications or a foreground application currently used by the user needs to occupy a large amount of system resources, that is, when a medium core or a small core of the CPU is required to provide some computing resources, an invalid drawing operation of a background application occupies a computing resource of the system. As a result, frame freezing occurs on foreground applications, reducing user experience. Moreover, because different electronic devices have different hardware features, taking a CPU as an example, a system scheduling method cannot adapt to CPUs of different models from different manufacturers.

It may be understood that, in the foregoing system scheduling method for a background application, differentiated scheduling is performed with reference to the hardware feature of the electronic device to ensure system resources of foreground applications as much as possible.

However, the system scheduling method does not prevent the background application from performing the invalid drawing operation. This wastes system resources and increases power consumption of the electronic device.

In the second system scheduling method related to a background application, a background application is frozen in time, so that the background application cannot occupy a system resource.

Figure 7:
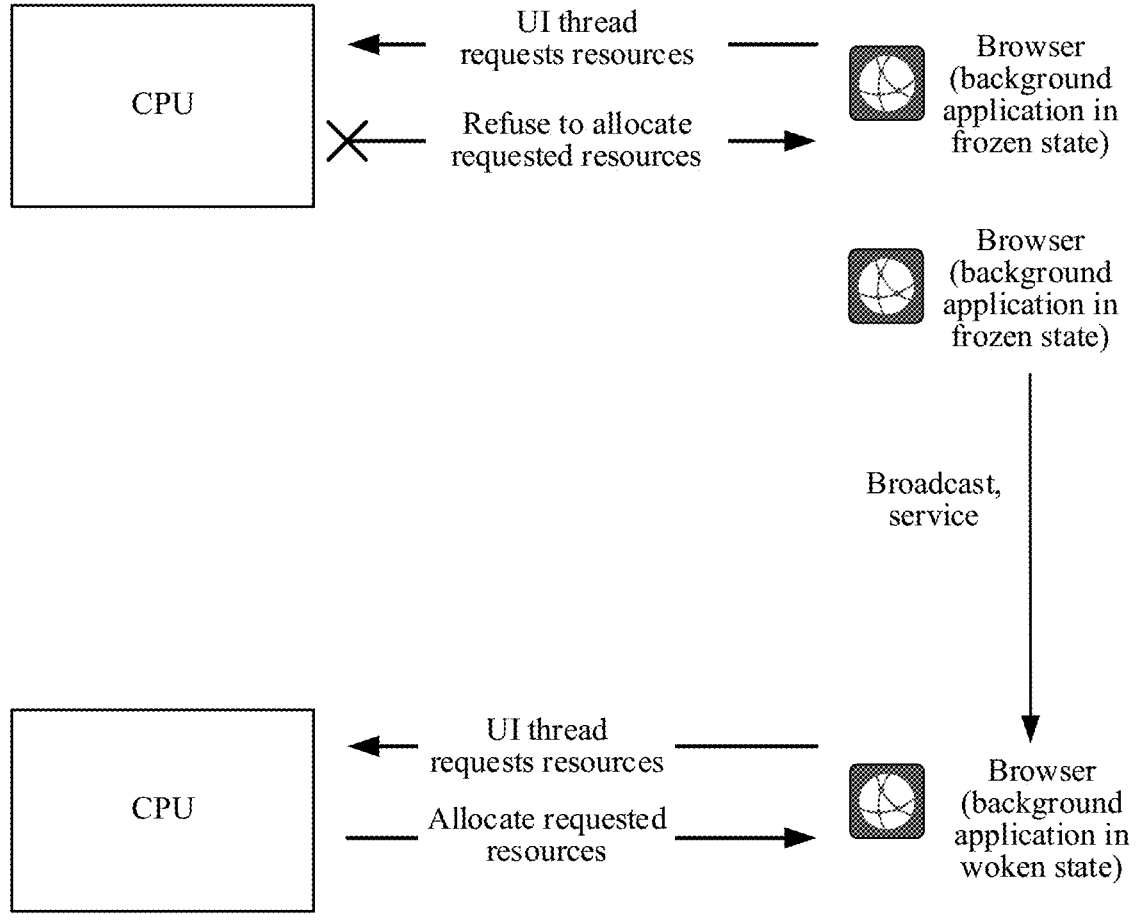
FIG. 7 is a schematic diagram of another example of a system scheduling method for a background application according to this application.

FIG. 7 is a schematic diagram of another example of a system scheduling method for a background application according to this application.

When an application program is converted from a foreground application to a background application, the electronic device may freeze the application program. The application program needs to request a system resource from the electronic device to perform a drawing operation, but the electronic device does not allocate a system resource to the frozen application program. Therefore, the frozen application program does not perform an invalid drawing operation. However, a frozen background application is often woken up by a broadcast, a service, or the like. The woken background application still performs an invalid drawing operation, occupying a system resource, and increasing power consumption of the electronic device.

As shown in FIG. 7, when a browser application is switched to the background, Browser application is frozen. The frozen browser application cannot occupy a system resource of the electronic device, and therefore cannot perform a drawing operation. However, the frozen browser application is often woken up by a broadcast or a service of an operating system or another application, and the woken browser application still performs an invalid drawing operation.

It may be understood that a background application may be frozen, so that the background application cannot perform an invalid drawing operation.

However, a frozen background application is often woken up, and the woken background application can still perform an invalid drawing operation, occupying a system resource and increasing power consumption of the electronic device.

To prevent a background application from performing an invalid drawing operation to reduce occupation of system resources and reducing power consumption of the electronic device, this application provides a method for performing a drawing operation by an application and an electronic device. When an application program changes from a foreground application to a background application, the application program determines a background drawing frequency according to a drawing frequency limiting policy, and intercepts a vertical synchronization signal or intercepts a choreographer from processing an animation event task based on the determined background drawing frequency, to effectively reduce invalid drawing operations performed by the background application, and further reduce occupation of system resources by the background application and reduce power consumption of the electronic device.

The following describes an electronic device provided in this application.

In embodiments of this application, the electronic device may be a mobile electronic device such as a mobile phone or a tablet computer, or may be a device such as a smart television or a personal computer (PC). This is not limited herein.

Figure 8:
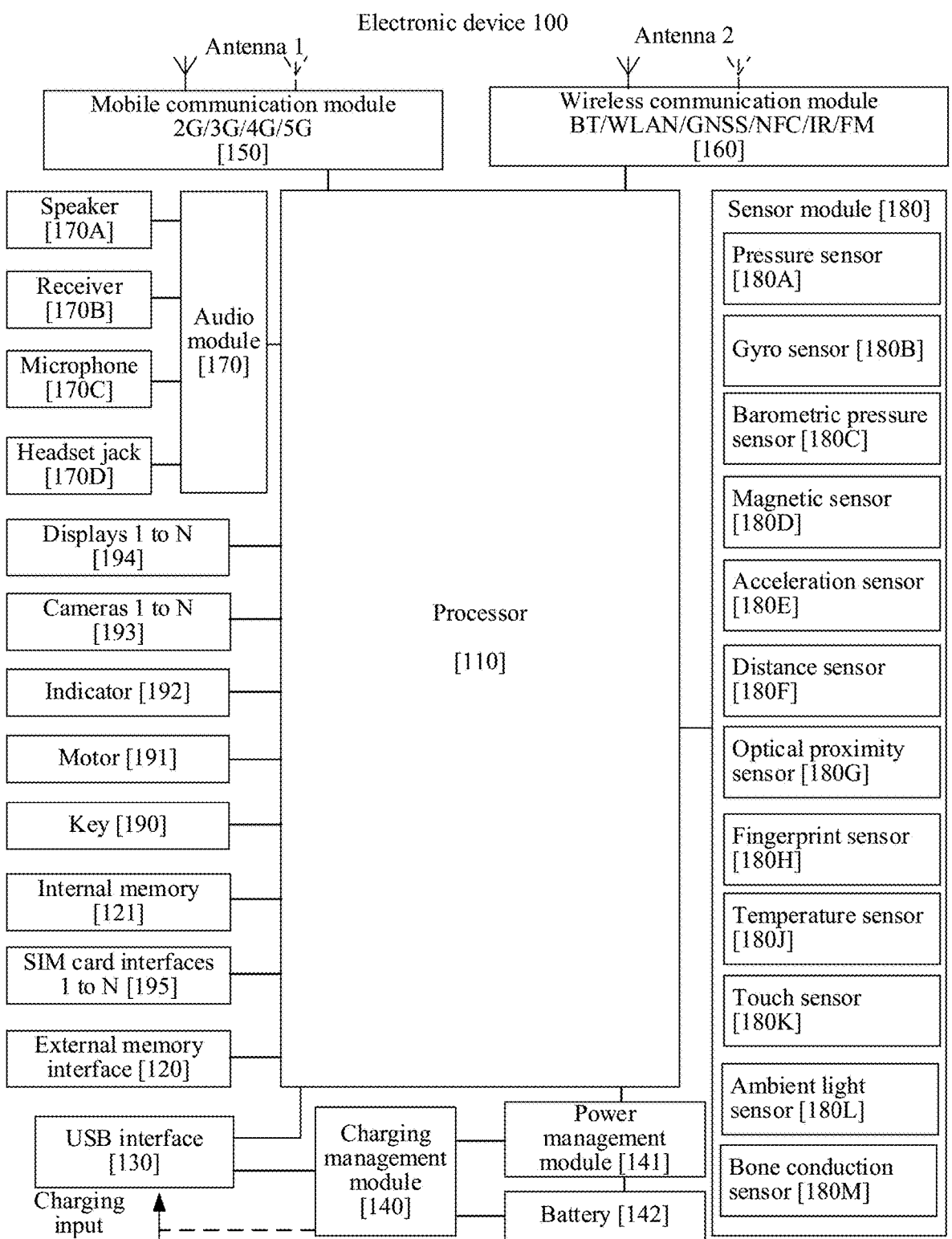
FIG. 8 is a schematic diagram of a structure of an electronic device 100 according to an embodiment of this application.

For example, FIG. 8 is a schematic diagram of a structure of an electronic device 100 according to an embodiment of this application.

The following uses the electronic device 100 as an example to describe this embodiment in detail. It should be understood that the electronic device 100 may have more or fewer components than those shown in the figure, may combine two or more components, or may have different component configurations. Various components shown in the figure may be implemented in hardware, software, or in a combination of hardware and software that includes one or more signal processing and/or application-specific integrated circuits.

The electronic device 100 may include: a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor no may be separately coupled to the touch sensor 180K, a charger, a flash, the camera 193, and the like through different I2C bus interfaces. For example, the processor no may be coupled to the touch sensor 180K through the I2C interface, so that the processor no communicates with the touch sensor 180K through the I2C bus interface, to implement a touch function of the electronic device 100.

The I2S interface may be configured to perform audio communication. In some embodiments, the processor no may include a plurality of groups of I2S buses. The processor 110 may be coupled to the audio module 170 through the I2S bus, to implement communication between the processor no and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is generally configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 via the CSI, to implement a photographing function of the electronic device 100. The processor 110 communicates with the display 194 via the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

A SIM interface may be used to communicate with a SIM card interface 195 to realize a function of transmitting data to a SIM card or reading data in a SIM card.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device. Alternatively, the USB interface may be configured to connect to a headset for playing audio through the headset. The interface may be further configured to connect to another electronic device such as an AR device.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger.

The power management module 141 is configured to connect the battery 142 and the charging management module 140 to the processor 110. The power management module 141 receives input of the battery 142 and/or the charging management module 140, to supply power to the processor 110, the internal memory 121, an external memory, the display 194, the camera 193, the wireless communication module 160, and the like.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further reused, to improve antenna utilization. For example, the antenna 1 may be multiplexed as a diversity antenna of a wireless local area network. In some other embodiments, an antenna may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. The demodulator then transmits the low-frequency baseband signal obtained through demodulation to the baseband processor for processing. The low-frequency baseband signal is processed by the baseband processor and then transmitted to the application processor. The application processor outputs a sound signal by an audio device (not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division synchronous code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (MPEG)-1, MPEG-2, MPEG-3, and MPEG-4.

The NPU is a neural-network (NN) computation processor. The NPU quickly processes input information by referring to a structure of a biological neural network, for example, by referring to a mode of transmission between human brain neurons, and continuously performs self-learning. Applications such as intelligent cognition of the electronic device 100 may be implemented through the NPU, for example, image recognition, facial recognition, speech recognition, and text understanding.

The internal memory 121 may include one or more random access memories (RAMs) and one or more non-volatile memories (NVMs).

The random access memory may include a static random access memory (SRAM), a dynamic random access memory (DRAM), a synchronous dynamic random access memory (SDRAM), a double data rate synchronous dynamic random access memory (DDR SDRAM, for example, a 5th generation DDR SDRAM is generally referred to as a DDR5 SDRAM), and the like.

The non-volatile memory may include a magnetic disk storage device and a flash memory.

Flash memories may be divided according to an operation principle and include a NOR FLASH, a NAND FLASH, a 3D NAND FLASH, and the like; may be divided according to a potential level of a storage unit and include a single-level storage unit (single-level cell (SLC)), a multi-level storage unit (multi-level cell (MLC)), a triple-level storage unit (triple-level cell (TLC)), a quad-level storage unit (quad-level cell (QLC)), and the like; or may be divided according to a storage specification and include a universal flash storage (UFS), an embedded multimedia card (eMMC), and the like.

The random access memory may be directly read and written by the processor 110, may be configured to store an executable program (for example, machine instructions) of an operating system or another running program, and may be further configured to store data of a user and an application program, and the like.

The non-volatile memory may also store an executable program, data of a user, data of an application program, and the like, which may be loaded into the random access memory in advance for directly reading and writing by the processor 110.

The external memory interface 120 may be configured to connect to an external non-volatile memory, to extend a storage capability of the electronic device 100. The external non-volatile memory communicates with the processor 110 through the external memory interface 120, to implement a data storage function. For example, files such as music and videos are stored in the external non-volatile memory.

The electronic device 100 may implement an audio function, for example, music playing and recording, through the audio module 170, the speaker 170A, the receiver 170B, the microphone 170C, the headset jack 170D, the application processor, for example, implement a music playback function and a recording function.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a moving posture of the electronic device 100. In some embodiments, an angular velocity of the electronic device 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used for navigation and motion-controlled gaming scenarios.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (generally on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light through the light emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The key 190 includes a power key, a volume key, and the like. The key 190 may be a mechanical key, or may be a touch key. The electronic device 100 may receive a key input, and generate a signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into the same SIM card interface 195 simultaneously. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication.

In this embodiment of this application, the processor 110 may invoke computer instructions stored in the internal memory 121, so that the electronic device 100 performs the method for performing a drawing operation by an application in embodiments of this application.

Figure 9:
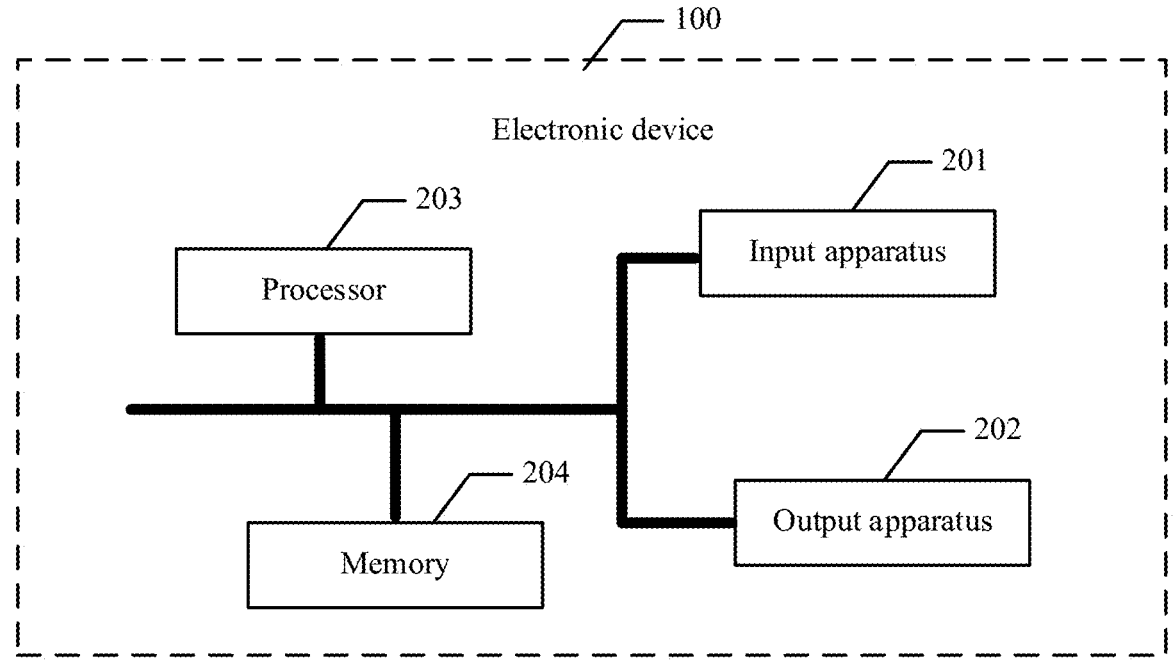
FIG. 9 is a schematic diagram of another structure of an electronic device 100 according to an embodiment of this application.

For example, FIG. 9 is a schematic diagram of another structure of an electronic device 100 according to an embodiment of this application.

The electronic device 100 includes:
an input apparatus 201, an output apparatus 202, a processor 203, and a memory 204 (where there may be one or more processors 203 in the electronic device 100, and one processor 203 is used as an example in FIG. 9). In some embodiments of this application, the input apparatus 201, the output apparatus 202, the processor 203, and the memory 204 may be connected by a bus or in another manner.

The processor 203 invokes operation instructions stored in the memory 204, so that the electronic device 200 performs the method for performing a drawing operation by an application in embodiments of this application.

Figure 10:
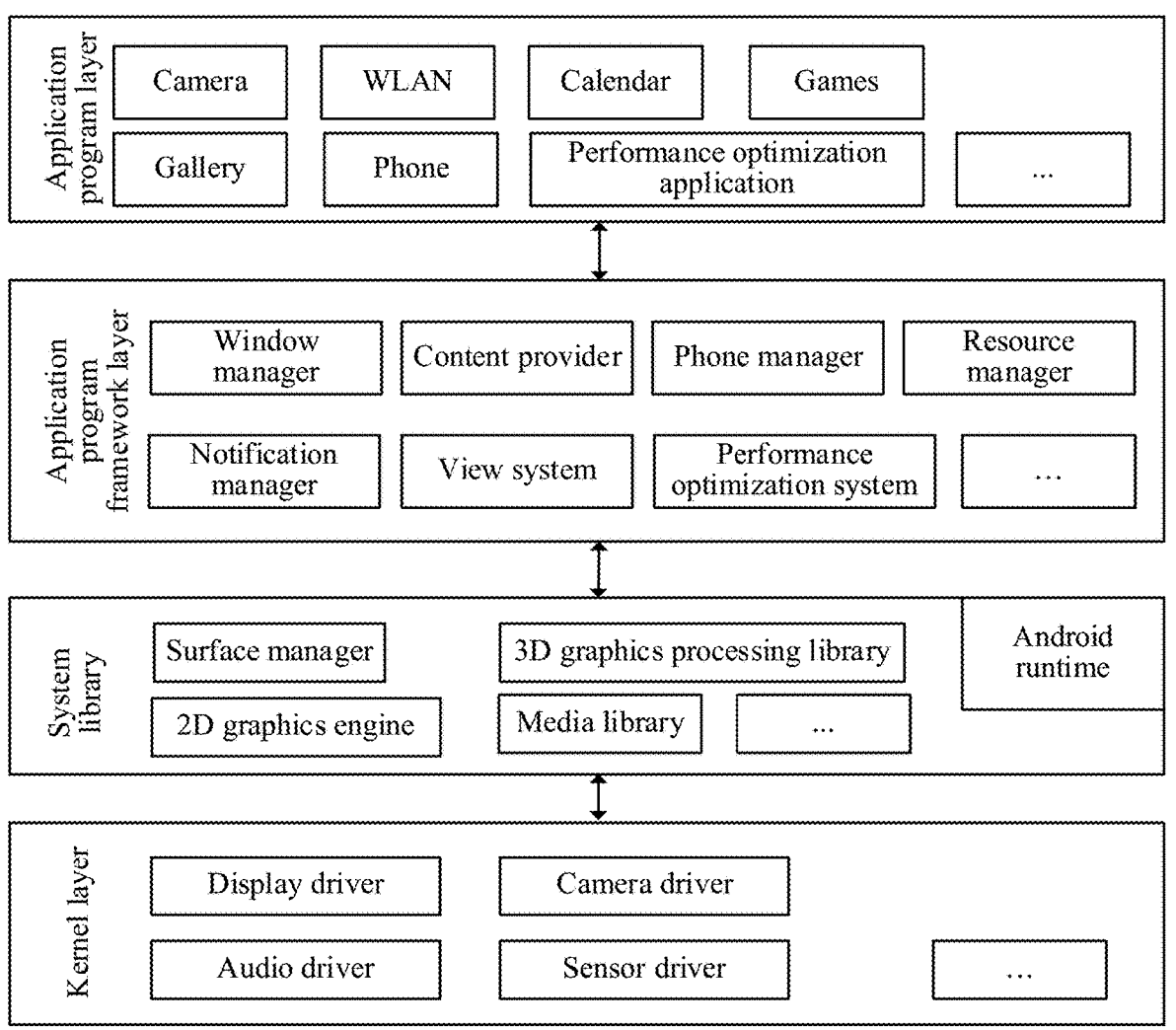
FIG. 10 is a schematic block diagram of a software structure of an electronic device 100 according to an embodiment of this application.

For example, FIG. 10 is a schematic block diagram of a software structure of an electronic device 100 according to an embodiment of this application.

In a layered architecture, software is divided into several layers, and each layer has a clear role and task. Layers communicate with each other through software interfaces. In some embodiments, a system is divided into four layers from top to bottom: an application program layer, an application program framework layer, a runtime, a system library, and a kernel layer.

The application program layer may include a series of application packages.

As shown in FIG. 10, the application packages may include application programs (or referred to as applications) such as Camera, Gallery, Calendar, Phone, Maps, Navigation, WLAN, Bluetooth, Music, Videos, and Messages.

The application program layer may further include a performance optimization application. The performance optimization application may provide a visual interface or view, or may not provide a visual interface or view. After the electronic device is started, the performance optimization application can be automatically started without a user operation. The performance optimization application stores a drawing frequency limiting policy used to determine a correspondence between an application program and a background drawing frequency. After being started, the performance optimization application may access a server through a network to determine a parameter in the drawing frequency limiting policy, or may read a local configuration file of an operating system to determine a parameter in the drawing frequency limiting policy. The performance optimization application is provided with an interface, and another application may access the performance optimization application through the interface to determine a background drawing frequency of the application.

Alternatively, after being started, an application program generates a drawing frequency limiting module to read the local configuration file of the system to obtain the drawing frequency limiting policy, and determines a background drawing frequency of the application program according to the drawing frequency limiting policy.

The application program framework layer provides an application programming interface (API) and a programming framework for an application at the application program layer. The application program framework layer includes some predefined functions.

As shown in FIG. 10, the application program framework layer may include a window manager, a content provider, a view system, a phone manager, a resource manager, a notification manager, a local Profile assistant (LPA), and the like.

The window manager is configured to manage window programs. The window manager can obtain a size of a display, determine whether there is a status bar, lock the screen, and capture the screen.

The content provider is configured to store and retrieve data and make the data accessible to application programs. The data may include a video, an image, audio, calls that are made and received, a browsing history and bookmarks, an address book, and the like.

The phone manager is configured to provide a communication function of the electronic device 100, for example, call status management (including call connection and hang-up)

The resource manager provides various resources for application programs, such as localized strings, icons, pictures, layout files, and video files.

The notification manager enables an application program to display notification information in a status bar, and may be configured to convey a notification message. The displayed notification information may disappear after a short pause without user interaction. For example, the notification manager is configured to notify download completion, message reminder, and the like. The notification manager may alternatively be a notification that appears in the form of a chart or scroll bar text on the top of a system status bar, for example, a notification of an application program running in the background, or may be a notification that appears on the screen in the form of a dialog interface. For example, text information is prompted in the status bar, a prompt tone is played, the electronic device vibrates, or an indicator blinks.

The view system includes visual controls such as a control for displaying text and a control for displaying a picture. The view system can be used to build application programs. The display interface may be formed by one or more views. For example, a display interface including a short message notification icon may include a view for displaying text and a view for displaying a picture.

The application program framework layer may further include a performance optimization system, and a drawing frequency limiting policy may be stored in the performance optimization system. After an application program is started, the performance optimization system may be directly accessed by using a callback method provided by the operating system to determine a background drawing frequency of the application program.

The runtime includes a core library and a virtual machine. The runtime is responsible for scheduling and management of an Android system.

The core library includes two parts: One part is a functional function that a java language needs to call, and the other part is the core library.

The application program layer and the application program framework layer run in the virtual machine. The virtual machine executes java files of the application program layer and the application program framework layer as binary files. The virtual machine is configured to implement functions such as object life cycle management, stack management, thread management, security and exception management, and garbage collection.

The system library may include a plurality of functional modules, for example, a surface manager, a media library, and a three-dimensional graphics processing library (for example, OpenGL ES), and a two-dimensional graphics engine (for example, SGL).

The surface manager is configured to manage a display subsystem, and provides a fusion of two-dimensional (2D) and three-dimensional (3D) layers for a plurality of application programs.

The media library supports playing and recording of a plurality of commonly used audio and video formats, static image files, and the like. The media library supports a plurality of audio and video encoding formats, for example, MPEG4, H.264, MP3, AAC, AMR, JPG, and PNG.

The three-dimensional graphics processing library is configured to implement 3D graphics drawing, image rendering, synthesis, and layer processing.

The 2D graphics engine is a drawing engine for 2D drawing.

The kernel layer is a layer between hardware and software. The kernel layer includes at least a display driver, a camera driver, an audio driver, a sensor driver, and a virtual card driver.

The choreographer in this application may be located in the view system at the application program framework layer. When an application program needs to refresh an interface, the application program invokes the choreographer in the view system, generates a choreographer object unique to the application program, and performs a drawing operation. When performing a drawing operation, the choreographer can implement the drawing operation using the surface manager, the two-dimensional graphics engine, and the like in the core library by using a callback method.

It should be noted that, as an operating system version is updated, the server may update a configuration file in a file of the new version to update the drawing frequency limiting policy.

Figure 11:
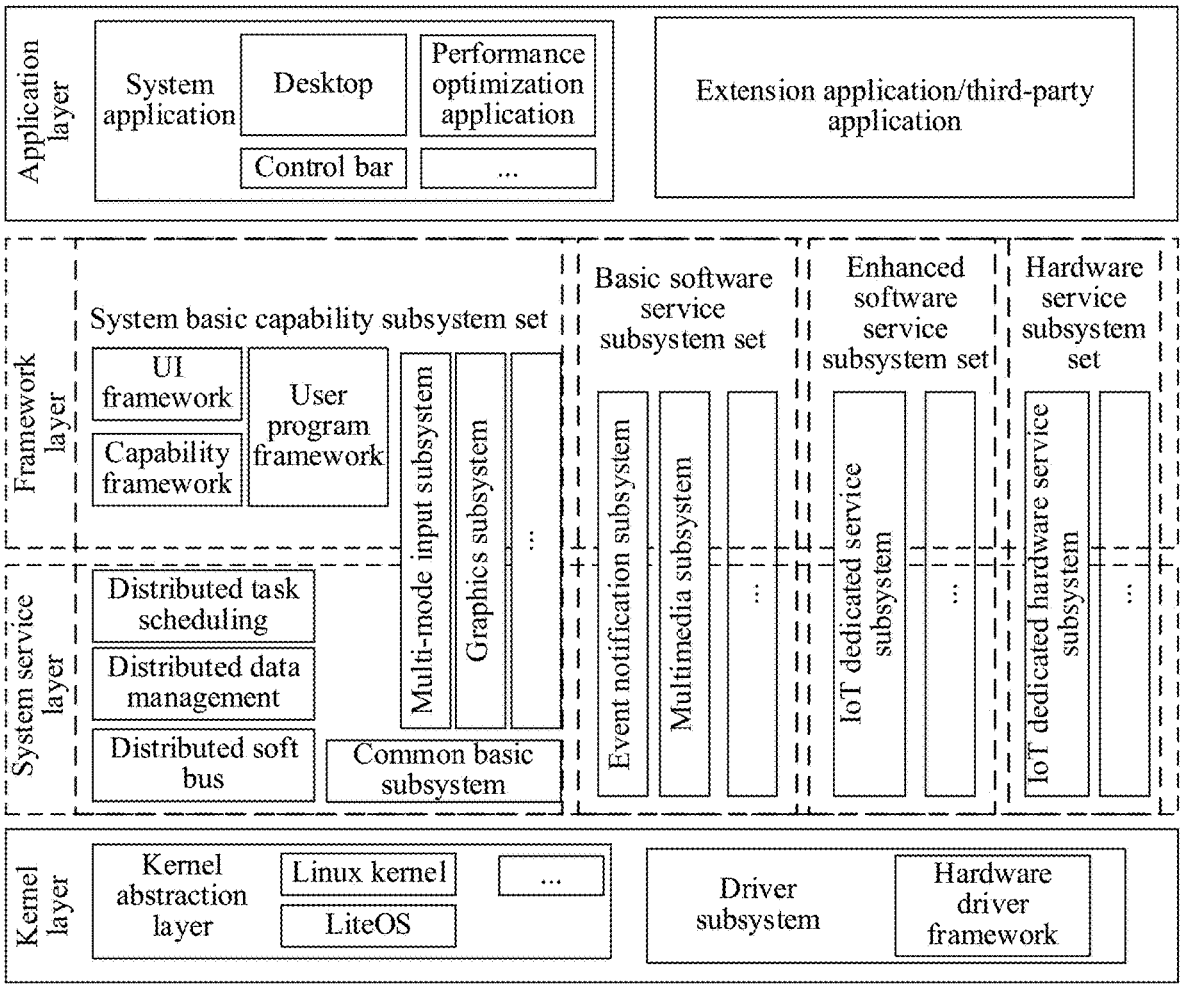
FIG. 11 is a schematic block diagram of another software structure of an electronic device 100 according to an embodiment of this application.

For example, FIG. 11 is a schematic block diagram of another software structure of an electronic device 100 according to an embodiment of this application.

In some embodiments, a system is divided into four layers from top to bottom: an application layer, a framework layer, a system service library, and a kernel layer.

The application layer includes a system application and a third-party non-system application.

The system application may include a performance optimization application. The performance optimization application may provide a visual interface or view, or may not provide a visual interface or view. After the electronic device is started, the performance optimization application can be automatically started without a user operation. The performance optimization application stores a drawing frequency limiting policy used to determine a correspondence between an application program and a background drawing frequency. After being started, the performance optimization application may access a server through a network to determine a parameter in the drawing frequency limiting policy, or may read a local configuration file of an operating system to determine a parameter in the drawing frequency limiting policy. The performance optimization application is provided with an interface, and another application may access the performance optimization application through the interface to determine a background drawing frequency of the application.

Alternatively, after being started, an application program generates a drawing frequency limiting module to read the local configuration file of the system to obtain the drawing frequency limiting policy, and determines a background drawing frequency of the application program according to the drawing frequency limiting policy.

The framework layer provides JAVA/C/C++/JS and other multi-language user program frameworks and capability frameworks for application programs at the application layer, as well as multi-language framework APIs that are open to the outside world for various software and hardware services.

The system service layer includes: a system basic capability subsystem set, a basic software service subsystem set, an enhanced software service subsystem set, and a hardware service subsystem set.

The system basic capability subsystem set supports operations such as operation, scheduling, and migration of the operating system on a plurality of devices. The system basic capability subsystem set may include: a distributed soft bus, distributed data management, distributed task scheduling, and a common basic subsystem. The system service layer and the framework layer jointly implement a multi-mode input subsystem, a graphics subsystem, and the like. A drawing frequency limiting policy may be stored in the graphics subsystem. After an application program is started, the graphics subsystem may be directly accessed by using a callback method provided by the operating system to determine a background drawing frequency of the application program. The choreographer in this application may be located in the graphics subsystem. When an application program needs to refresh an interface, the application program invokes the choreographer in the view system, generates a choreographer object unique to the application program, and performs a drawing operation.

The basic software service subsystem set provides common and general software services for the operating system, and may include: an event notification subsystem, a multimedia subsystem, and the like.

The enhanced software service subsystem set provides differentiated software services for different devices, and may include: an IoT dedicated service subsystem.

The hardware service subsystem set provides hardware services for the operating system, and may include: an IoT dedicated hardware service subsystem.

It should be noted that, based on deployment environments of different device forms, the system basic capability subsystem set, the basic software service subsystem set, the enhanced software service subsystem set, and the hardware service subsystem set may be re-divided according to other function granularities.

The kernel layer includes a kernel abstraction layer and a driver subsystem. The kernel abstraction layer includes a plurality of kernels, and provides basic kernel capabilities for an upper layer by shielding a difference between the plurality of kernels, for example, thread/process management, memory management, file system, and network management. The driver subsystem provides a unified peripheral access capability and a driver development and management framework for software developers.

It should be noted that, according to different operating systems and possible future upgrades, the software structure of the electronic device may be divided in another manner according to the operating system.

The following describes a method for performing a drawing operation by an application provided in this application.

Figure 12:
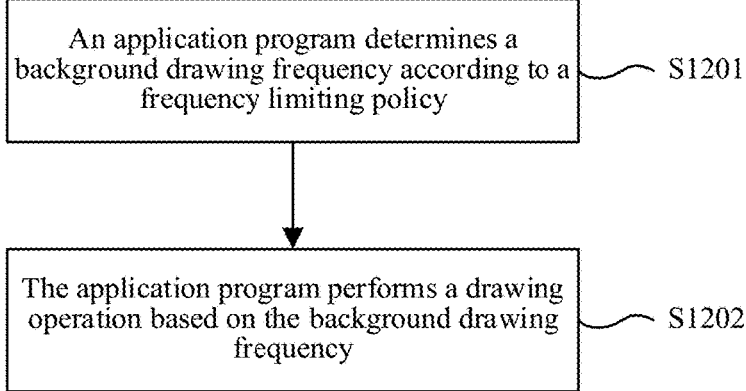
FIG. 12 is a schematic diagram of an example of a method for performing a drawing operation by an application according to this application.

FIG. 12 is a schematic diagram of an example of a method for performing a drawing operation by an application according to this application.

As shown in FIG. 12, the method for performing a drawing operation by an application provided in this application may include the following steps.

S1201: An application program determines a background drawing frequency based on a frequency limiting policy.

When the application program is converted from a foreground application to a background application, the application program determines the background drawing frequency according to the frequency limiting policy.

Specifically, first, the application program needs to determine when the application program is converted from a foreground application to a background application. An operating system provides a drawing frequency limiting module, configured to determine whether the application program is a foreground application or a background application. The drawing frequency limiting module may directly listen to a life cycle of a main activity of the application program through a configuration interface, and may further determine a running status of the application program, that is, determine whether the application program is a foreground application or a background application. Alternatively, the drawing frequency limiting module may determine the running status of the application program by using an activity manager service, that is, determine whether the application program is a foreground application or a background application.

Second, when it is determined that the application program is converted from a foreground application to a background application, the application program may determine the background drawing frequency of the application program according to the drawing frequency limiting policy. The background drawing frequency is a frequency at which a choreographer of the application program performs a drawing operation after the application program becomes a background application.

In this embodiment of this application, the drawing frequency limiting policy is pre-configured, and is for setting background drawing frequencies when different applications become background applications.

The drawing frequency limiting policy may be configured in the drawing frequency limiting module, where the drawing frequency limiting module may communicate with the choreographer of the application program through an interface. Specifically, the drawing frequency limiting module may be pre-configured by the operating system. To be specific, the drawing frequency limiting module may be configured inside each application program. Alternatively, the drawing frequency limiting module may be configured in a service of the operating system/or configured in another application that keeps in a running state. The application program may access the drawing frequency limiting module through the interface to determine the background drawing frequency of the application program.

The background drawing frequency determined by the application program is less than a generation frequency (or a screen refresh rate) of a vertical synchronization signal.

It is considered that when developing the application program, a developer of the application program may need to transfer some parameters to an activity of the application program or other modules through a drawing operation performed by the choreographer. In other words, the application program performs a drawing operation for a purpose of not refreshing the interface. In this case, when the application program is a background application, a frequency at which the background application requests the vertical synchronization signal is less than the generation frequency (or the screen refresh rate) of the vertical synchronization signal. In this case, the background drawing frequency determined by the application program in step S1201 may be less than or equal to the generation frequency (or the screen refresh rate) of the vertical synchronization signal.

Optionally, in some embodiments of this application, when the frequency at which the application program requests the vertical synchronization signal is less than the generation frequency (or the screen refresh rate) of the vertical synchronization signal, the background drawing frequency determined by the application program based on the frequency limiting policy may be equal to the generation frequency (or the screen refresh rate) of the vertical synchronization signal.

Optionally, in some implementations of this application, the background drawing frequency of the application program may be determined when the application program is started or after the application program is started.

Optionally, in some implementations of this application, the drawing frequency limiting module provides an interface for the application program to modify the background drawing frequency of the application program, and the application program may configure the background drawing frequency of the application program through the interface.

For example, as shown in Table 1, Table 1 is a schematic table of a drawing frequency limiting policy according to an embodiment of this application.

35

TABLE 1

| Vertical synchronization signal frequency Application | Gallery | Music |
|---|---|---|
| 60 Hz | 0 Hz | 10 Hz |
| 90 Hz | 0 Hz | 15 Hz |
| 120 Hz | 0 Hz | 20 Hz |

As shown in Table 1, when Music is switched to a background application, the background drawing frequency of Music is configured according to the drawing frequency limiting policy to be ⅙ of the frequency of the vertical synchronization signal. When Gallery is switched to a background application, the background drawing frequency of Gallery is configured according to the drawing frequency limiting policy to be 0.

It can be understood that different background drawing frequencies may be configured according to the drawing frequency limiting policy for different applications or different types of applications (social applications, game applications, and other applications). This helps to allocate system resources properly and reduce power consumption of the electronic device.

Optionally, as shown in the following content in FIG. 13(A) to FIG. 13(E), in some embodiments of this application, the user may personalize parameters in the drawing frequency limiting policy with reference to performance and use requirements of the electronic device.

FIG. 13(A) to FIG. 13(E) are schematic diagrams of examples of an interface of a drawing frequency limiting policy according to this application.

Figure 13A:
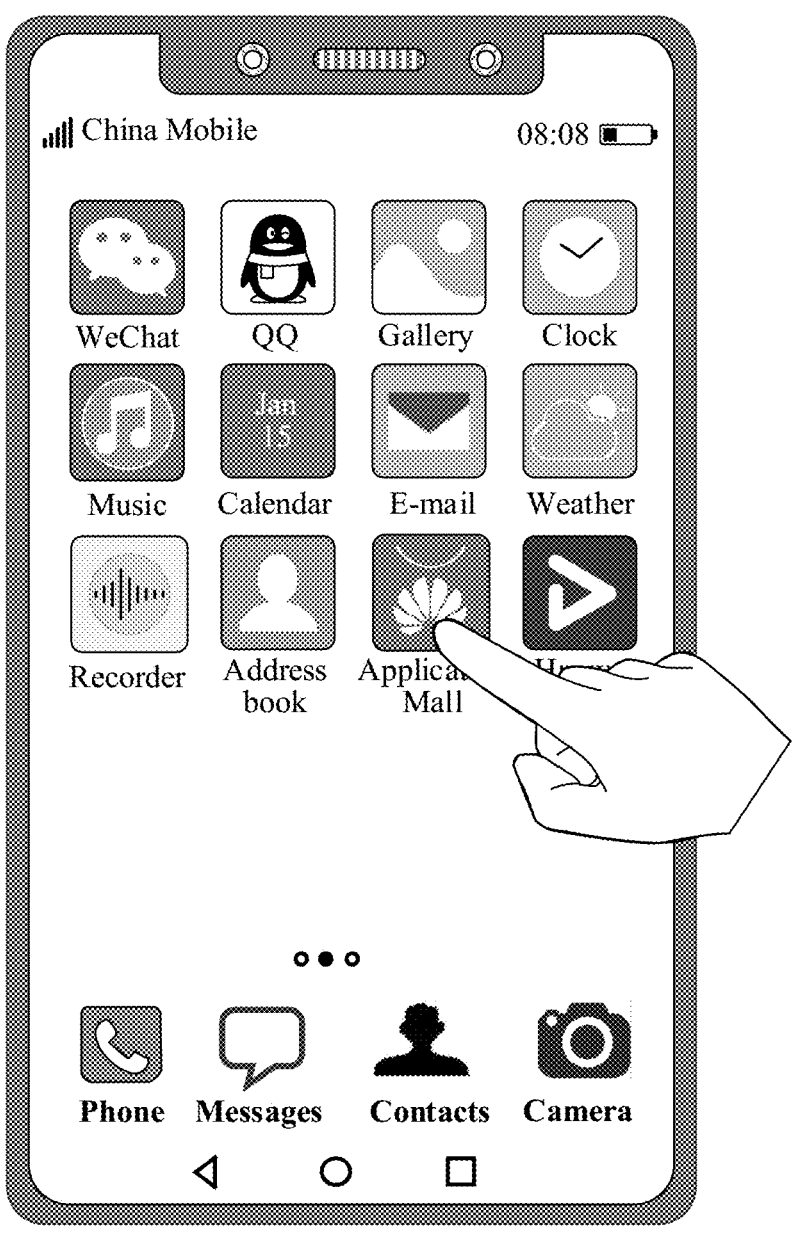
FIG. 13(A) to FIG. 13(E) are schematic diagrams of examples of an interface of a drawing frequency limiting policy according to this application.
Figure 13B:
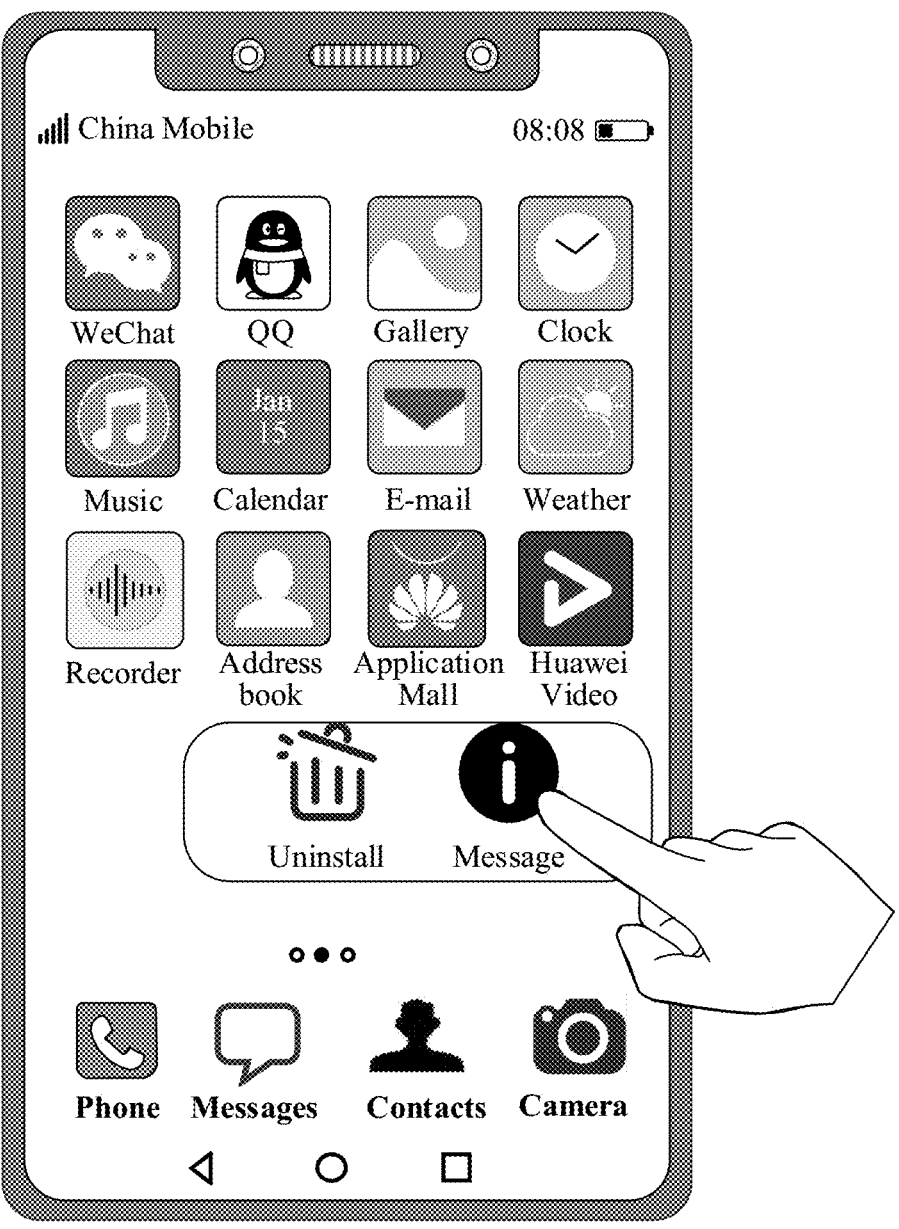
Figure 13C:
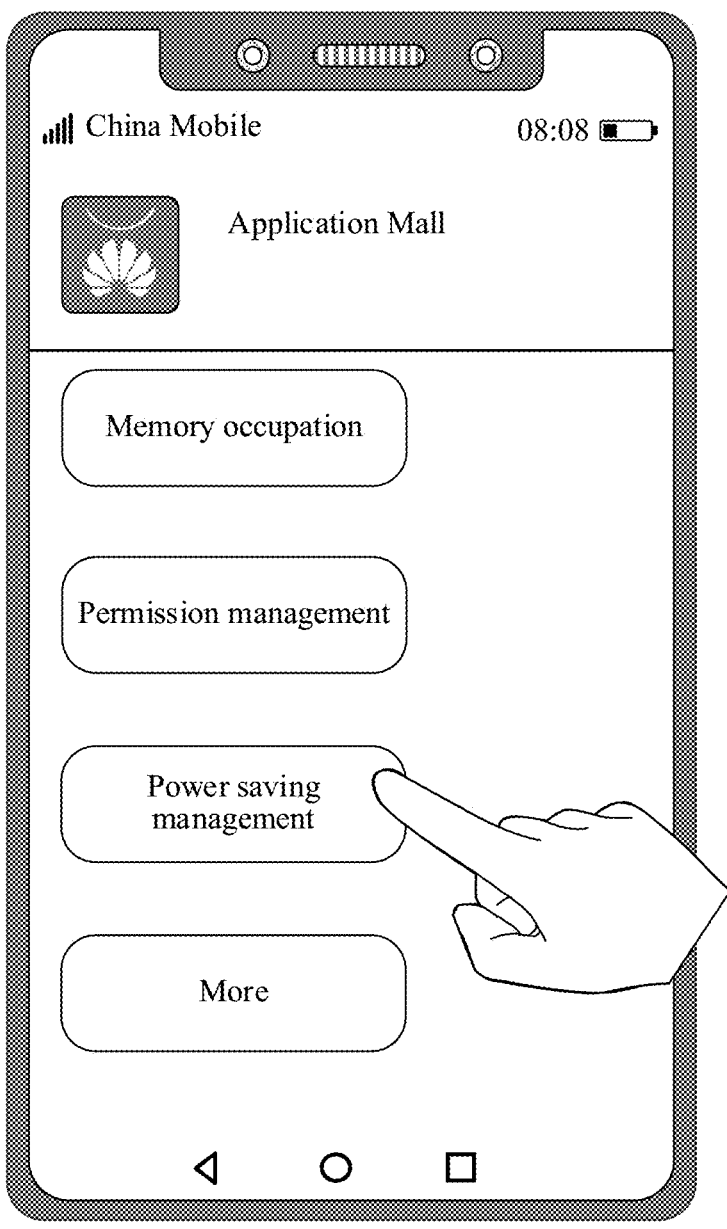
Figure 13D:
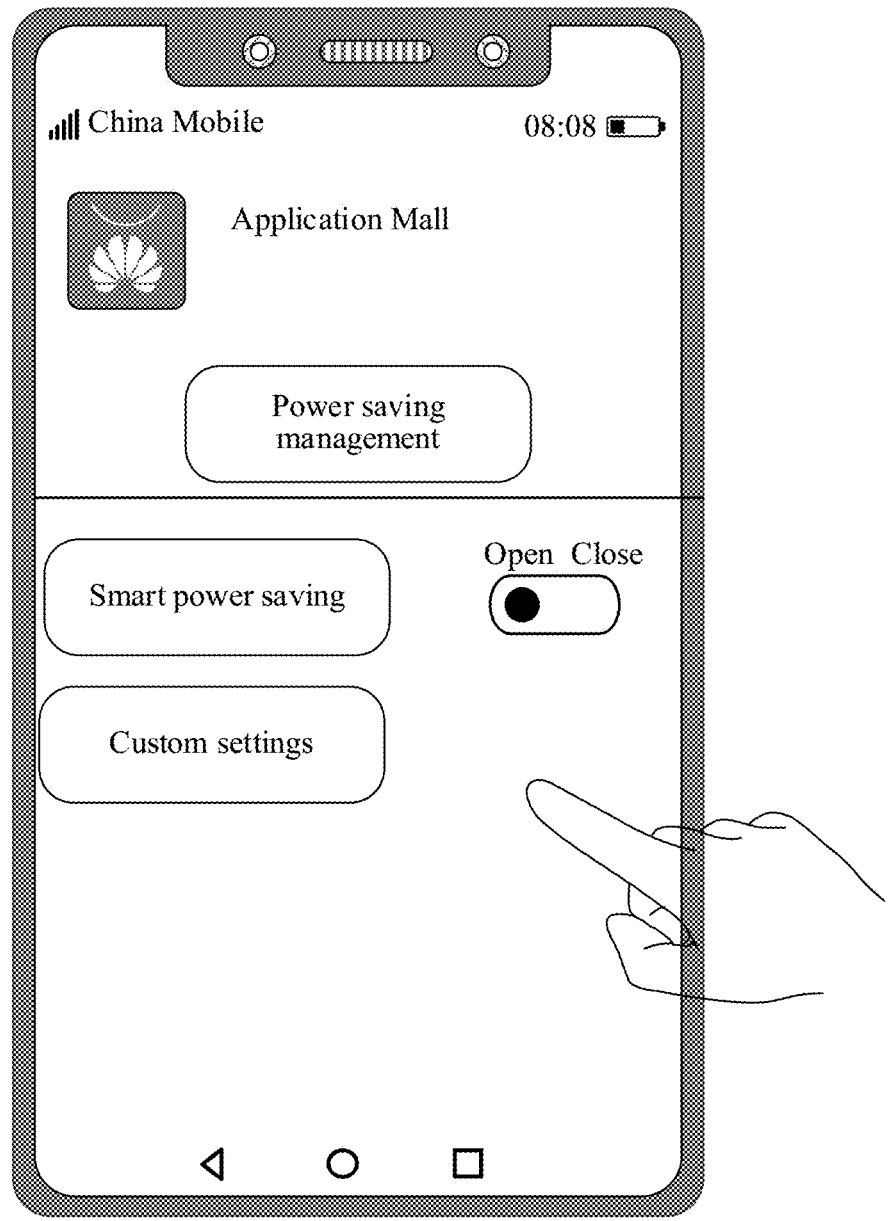
Figure 13E:
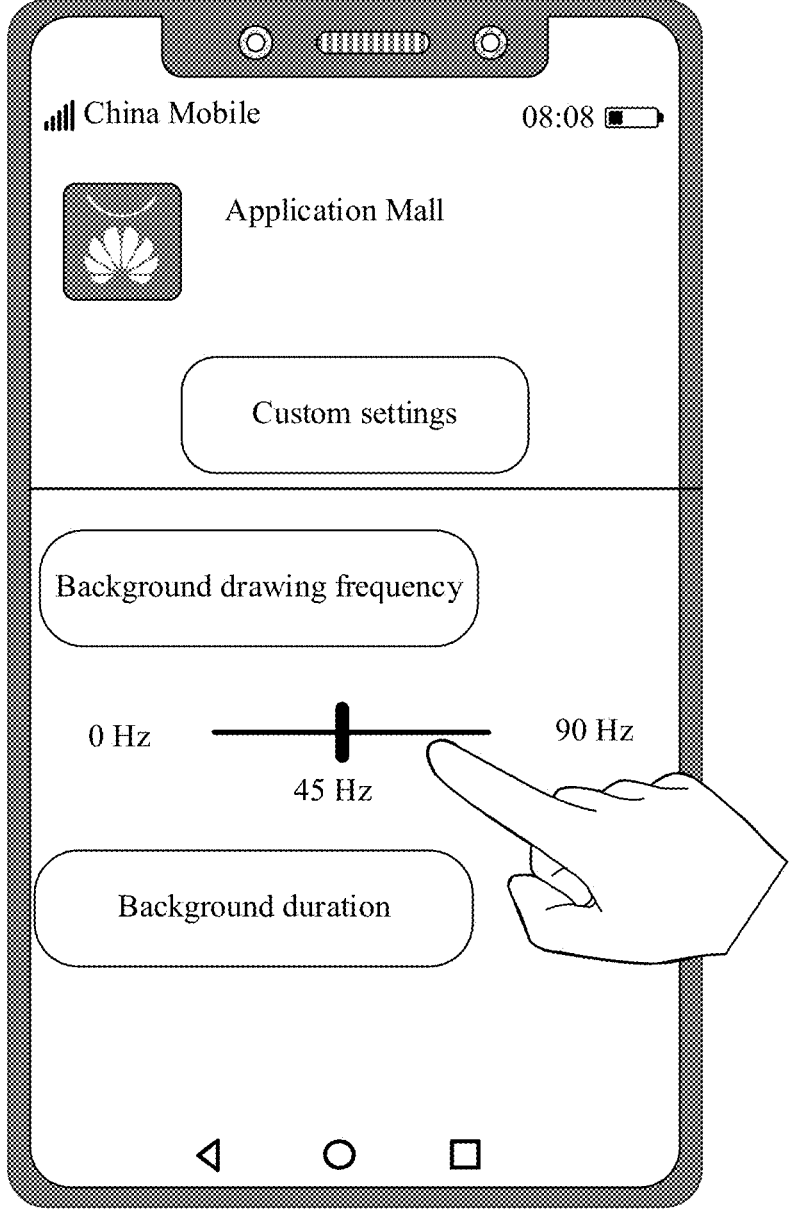

As shown in FIG. 13(A), a user may select an application program on a main interface of an electronic device through touching and holding, for example, select "Huawei AppGallery". Further, as shown in FIG. 13(B), after the user touches and holds to select the application program, the user may select an information option in a tapping manner. Further, as shown in FIG. 13(C), after the user selects the information option, the user may view related information of the application, where the information includes a power saving management option responsible for scheduling the application program. Further, as shown in FIG. 13(D), the user may configure, by configuring a specific parameter in the power saving management option, a drawing limiting frequency corresponding to the application program in a drawing frequency limiting policy. Further, as shown in FIG. 13(E), the user may specifically configure a background drawing frequency when the application program is converted into a background application.

It should be noted that, as shown in FIG. 13(D), when the user selects intelligent power saving, the application program determines the background drawing frequency of the application program based on the pre-configured parameter in the drawing frequency limiting policy.

For concepts of terms such as foreground application, background application, choreographer, and main activity, refer to text descriptions in (1) foreground application and background application, (2) activity, (3) choreographer and drawing operation in the foregoing term explanations. Details are not described herein again.

S1202: The application program performs a drawing operation based on the background drawing frequency.

Specifically, after determining the background drawing frequency, the choreographer of the application program intercepts a vertical synchronization signal or intercepts a drawing operation of the choreographer based on the background drawing frequency, so that the choreographer performs an invalid drawing operation based on the background drawing frequency.

For concepts of terms such as the invalid drawing operation, refer to text descriptions in choreographer and drawing operation (3) in the term explanation. Details are not described herein again.

Figure 14:
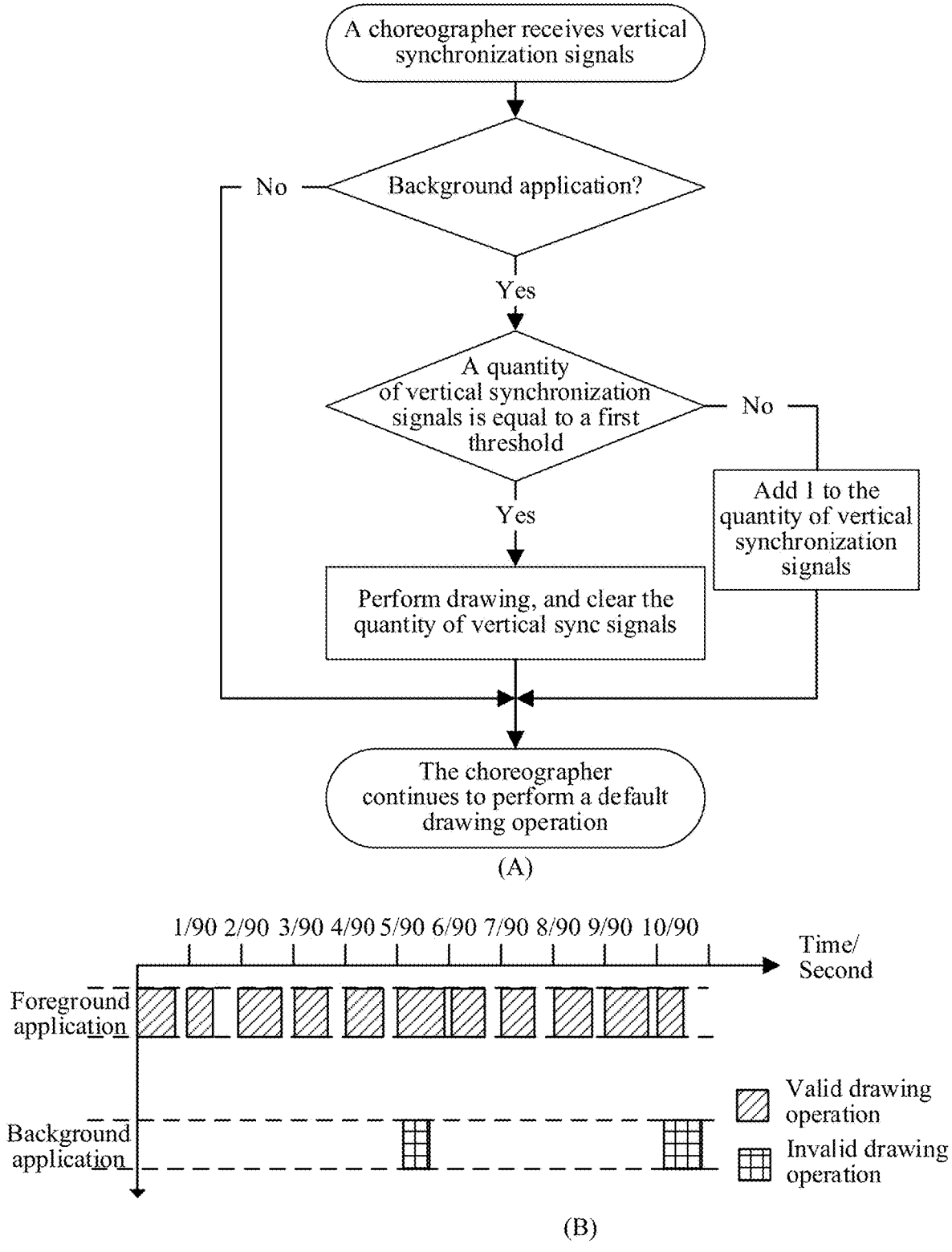
FIG. 14 is a schematic diagram of an example of a method for intercepting a choreographer from receiving a vertical synchronization signal according to an embodiment of this application.
Figure 15:
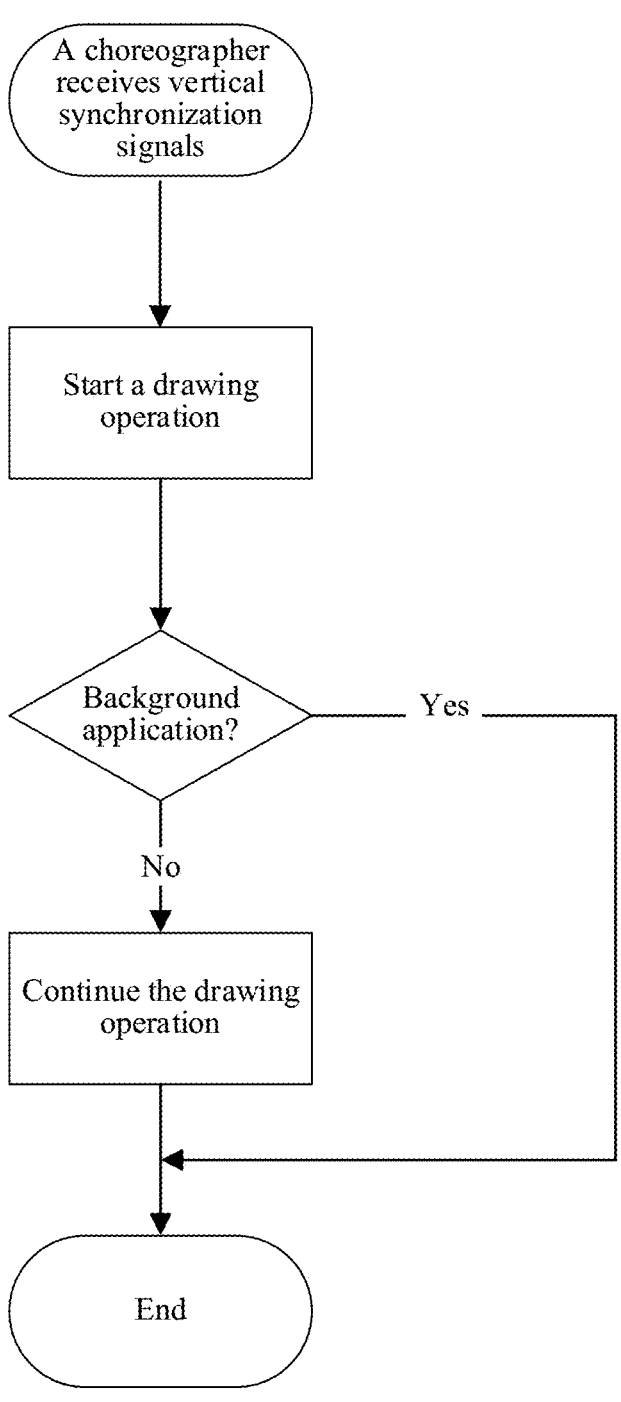
FIG. 15 is a schematic diagram of an example of a method for intercepting a choreographer from processing an animation event task according to an embodiment of this application.

With reference to content shown in FIG. 12, taking content shown in FIG. 14 and FIG. 15 as examples, the following separately describes in detail a method for intercepting a vertical synchronization signal based on a background drawing frequency and a method for intercepting a choreographer based on a background drawing frequency from performing a drawing operation.

FIG. 14 is a schematic diagram of an example of a method for intercepting a choreographer from receiving a vertical synchronization signal according to an embodiment of this application.

As shown in (A) in FIG. 14, after receiving vertical synchronization signals by using an OnVsync callback method, a choreographer of an application program first determines whether the application program to which the choreographer belongs is a foreground application or a background application. If the application program is a foreground application, a default drawing operation is performed. If the application program is a background application, the vertical synchronization signal is recorded as a $K^{th}$ vertical synchronization signal after the application program is switched to the background application, and a value of K and a first threshold are determined. If K is less than the first threshold, the default drawing operation is skipped; or if K is equal to the first threshold, K is cleared, recounted, and the default drawing operation is performed. Skipping the default drawing operation may indicate that the choreographer does not invoke a doFrame callback method, to intercept the drawing operation.

The electronic device may determine a background drawing frequency or the first threshold of the application program according to a drawing frequency limiting policy. After determining the background drawing frequency of the application program according to the drawing frequency limiting policy, the electronic device may determine the first threshold corresponding to the background drawing frequency. After determining the first threshold of the application program according to the drawing frequency limiting policy, the electronic device may determine the background drawing frequency corresponding to the first threshold.

For example, when both a generation frequency of the vertical synchronization signal and a screen refresh rate of the electronic device are 90 Hz, and the application program determines, according to a drawing frequency limiting policy, that the background drawing frequency is 18 Hz, the electronic device may determine the first threshold corresponding to the background drawing frequency of 18 Hz. The first threshold may be the generation frequency of the vertical synchronization signal (or the screen refresh rate) divided by the background application drawing frequency of the application program. In other words, the first threshold is 5. In this case, when the application program becomes a background application, the choreographer of the application program performs the default drawing operation only once every five vertical synchronization signals are received.

For another example, correspondingly, if the application program determines, according to the drawing frequency limiting policy, that the first threshold of the application program is 5, the electronic device may determine that the background drawing frequency corresponding to the first threshold 5 is 18 Hz.

It should be noted that, if the background drawing frequency is 0, the first threshold may be a large integer, for example, $2^{10}$. Alternatively, content shown in (A) in FIG. 14 may be changed. After the application program receives the vertical synchronization signals, K is cleared, so that the application program does not perform the default drawing operation. Alternatively, after receiving the vertical synchronization signals, the application program does not count the vertical synchronization signals, so that K is always equal to 0, and the application program does not perform the default drawing operation.

Specifically, as shown in (B) in FIG. 14, if the application program is a foreground application, an interval at which the application program performs the drawing operation is 1/90 seconds. In other words, the application program performs the drawing operation after receiving the vertical synchronization signal. If the application program is a background application, the interval at which the application program performs the drawing operation is 5/90 seconds. In other words, the application program performs the default drawing operation only after receiving five vertical synchronization signals. For example, every 1/90 seconds, starting at second 0, the choreographer of the application program requests a vertical synchronization signal. If the application program becomes a background application at second 0, second 1/90, second 2/90, second 3/90, and second 4/90, the drawing operation of the choreographer of the application program is intercepted because K is less than 5. At second 5/90, the choreographer of the application program receives the vertical synchronization signal. In this case, K=5. Therefore, the drawing operation of the application program is not intercepted, and the default drawing operation is performed once. The drawing operation performed when the application program is a background application is an invalid drawing operation.

It should be noted that time consumed for each drawing operation performed by the choreographer may be different or may be the same. This is not limited in this application.

FIG. 15 is a schematic diagram of an example of a method for intercepting a choreographer from processing an animation event task according to an embodiment of this application.

As shown in FIG. 15, a choreographer of an application program receives a vertical synchronization signal by using an OnVsync callback method and then begins to perform a drawing operation. The drawing operation includes processing an input event task, an animation event task, a layout event task, and a submission event task. Because the choreographer of the background application does not obtain the input event task, the layout event task, and the submission event task. Therefore, the choreographer may be intercepted from processing the animation event task, so that the choreographer is intercepted from performing an invalid drawing operation.

Specifically, after receiving the vertical synchronization signal and before starting to perform the drawing operation, the application program determines whether the application program to which the choreographer belongs is a background application. If the application program to which the choreographer belongs is a foreground application, the default drawing operation may be continued. If the application program to which the choreographer belongs is a background application, processing of the animation event task may be skipped in a doFrame callback method, or the drawing operation may be directly ended, so that the choreographer does not perform an invalid drawing operation.

For example, when a background drawing frequency is 0, it may be determined at the beginning of the doFrame callback method of the choreographer whether the application program to which the choreographer belongs is a foreground application or a background application. If a determining result is a background application, the choreographer can skip performing a doCallbacks callback method for processing the animation event task in the doFrame callback method. In this case, although the choreographer still calls the doCallbacks callback method to process the input event task, the layout event task, and the submission event task, the input event task, the layout event task, and the submission event task are empty. Therefore, the animation event task processed by the choreographer can be skipped to intercept the choreographer from performing the invalid drawing operation.

If the determining result is a foreground application, the default drawing operation is performed.

It should be noted that, when the background drawing frequency is greater than 0, a frequency at which a background application performs an invalid drawing operation as shown in (B) in FIG. 14 can also be reduced by intercepting the choreographer from processing the animation event task. For example, before the doCallbacks callback method is invoked to process the animation event task, it is determined that the vertical synchronization signal received by the choreographer is a $K^{th}$ vertical synchronization signal. When K is less than the first threshold, the choreographer skips processing of the animation event task. When K is equal to the first threshold, the choreographer is allowed to process the animation event task, and K is cleared and then recounted.

It may be understood that, by intercepting the choreographer from receiving the vertical synchronization signal or intercepting the choreographer from processing the animation event task, the frequency at which the background application performs the invalid drawing operation can be reduced.

When the background drawing frequency determined in step S1201 is equal to the generation frequency of the vertical synchronization signal (or the screen refresh rate), that is, the application program does not perform the drawing operation for a purpose of refreshing the interface, a minimum time interval T1 may be determined based on the background drawing frequency. According to T1, a drawing operation that needs to be intercepted is determined; and according to T1, a drawing operation that can be executed is determined.

Specifically, after the application program is switched to a background application, if a frequency at which the choreographer of the application program requests the vertical synchronization signal is less than the generation frequency of the vertical synchronization signal (or the screen refresh rate), it may be considered that the application performs the drawing operation for a purpose of not refreshing the interface. In this case, when the choreographer of the application program receives a first vertical synchronization signal, the default drawing operation is performed. When receiving a non-first vertical synchronization signal, the application program may determine a time interval between the vertical synchronization signal and a previous vertical synchronization signal. If the time interval is less than a time interval threshold corresponding to the background drawing frequency, a drawing operation corresponding to the vertical synchronization signal is intercepted. If the time interval is greater than the time interval threshold corresponding to the background drawing frequency, the drawing operation corresponding to the vertical synchronization signal is performed.

Figure 16:
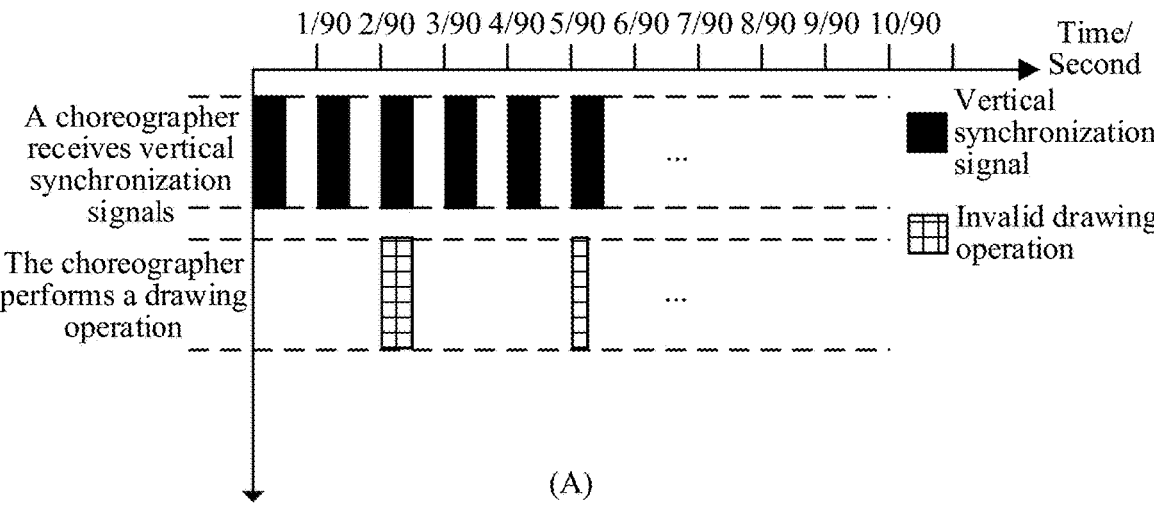
FIG. 16 is a schematic diagram of an example of intercepting a drawing operation of a choreographer according to an embodiment of this application.
Figure 16:
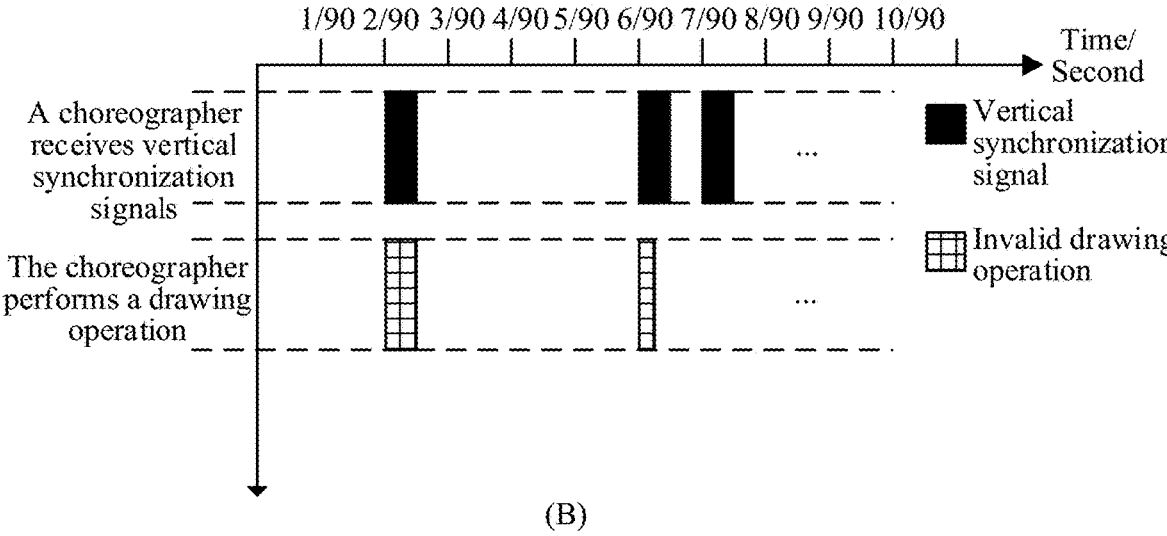

The following uses content shown in FIG. 16 as an example to specifically describe how an invalid drawing operation is intercepted when an application program performs a drawing operation for a purpose of not refreshing the interface.

FIG. 16 is a schematic diagram of an example of intercepting a drawing operation of a choreographer according to an embodiment of this application.

When a background drawing frequency of an application program is 30 Hz, a parameter T1 is 3/90 seconds. As shown in (A) in FIG. 16, a choreographer of the application program requests and receives a vertical synchronization signal sent by a SurfaceFlinger every 1/90 seconds. Therefore, in the case shown in (A) in FIG. 16, the application program performs a drawing operation for a purpose of refreshing an interface. When the application program performs an invalid drawing operation at second 2/90, a next invalid drawing operation is performed at second 5/90.

Different from the content shown in (A) in FIG. 16, as shown in (B) in FIG. 16, the choreographer of the application program requests and receives a vertical synchronization signal 1 at second 2/90, requests and receives a vertical synchronization signal 2 at second 6/90, and requests and receives a vertical synchronization signal 3 at second 7/90.

There may be a plurality of manners to determine whether the application program requests a drawing operation for a purpose of not refreshing the interface.

In the content shown in (B) in FIG. 16, for example, within second 0 to second 8/90, because a frequency at which the application program requests the vertical synchronization signal from the SurfaceFlinger is 4/15 Hz, which is lower than a generation frequency of the vertical synchronization signal 90 Hz (or a screen refresh rate), the application program performs the drawing operation for the purpose of not refreshing the interface. The frequency at which the application program requests the vertical synchronization signal is a quantity of times that the application program requests the vertical synchronization signal per unit time.

For another example, after the application program receives the vertical synchronization signal at second 2/90, but does not receive the vertical synchronization signal at second 3/90, it may be determined that the application program requests to perform the drawing operation for the purpose of not refreshing the interface.

At second 2/90, the choreographer of the application program receives the vertical synchronization signal 1; and before second 2/90, the choreographer of the application program does not receive other vertical synchronization signals. Therefore, the choreographer may perform a drawing operation corresponding to the vertical synchronization signal 1 at second 2/90. At second 6/90, the choreographer of the application program receives the vertical synchronization signal 2. The choreographer of the application program receives the vertical synchronization signal 1 at second 2/90 last time. The time interval is 4/90 seconds and is greater than T1. Therefore, the choreographer may perform the drawing operation corresponding to the vertical synchronization signal 1 at second 6/90. At second 7/90, the choreographer of the application program receives the vertical synchronization signal 3. The choreographer of the application program receives the vertical synchronization signal 1 at second 6/90 last time. The time interval is 1/90 seconds and is smaller than T1. Therefore, the drawing operation of the application program is intercepted.

Optionally, in some embodiments of this application, refer to the content shown in FIG. 13(A) to FIG. 13(E) and FIG. 14. In/before the OnVsync method, the choreographer receives the vertical synchronization signal, so that the frequency of performing the invalid drawing operation after the application program becomes a background application is reduced.

Optionally, in some embodiments of this application, refer to the content shown in FIG. 13(A) to FIG. 13(E) and FIG. 14. The choreographer is intercepted from requesting the vertical synchronization signal from the SurfaceFlinger, so that the frequency of performing the invalid drawing operation after the application program becomes a background application is reduced.

It should be noted that if the choreographer is intercepted from requesting the vertical synchronization signal from the SurfaceFlinger, or the choreographer is intercepted from receiving the vertical synchronization signal before the OnVsync method, the choreographer needs to be decoupled so that the choreographer is only prevented from performing the drawing operation, without affecting the normal work of other functions of the choreographer.

Optionally, in some embodiments of this application, refer to the content shown in FIG. 13(A) to FIG. 13(E) and FIG. 14. Data in a one-way linked list for storing the animation event task is deleted, so that the frequency of performing the invalid drawing operation after the application program becomes a background application is reduced.

Figure 17:
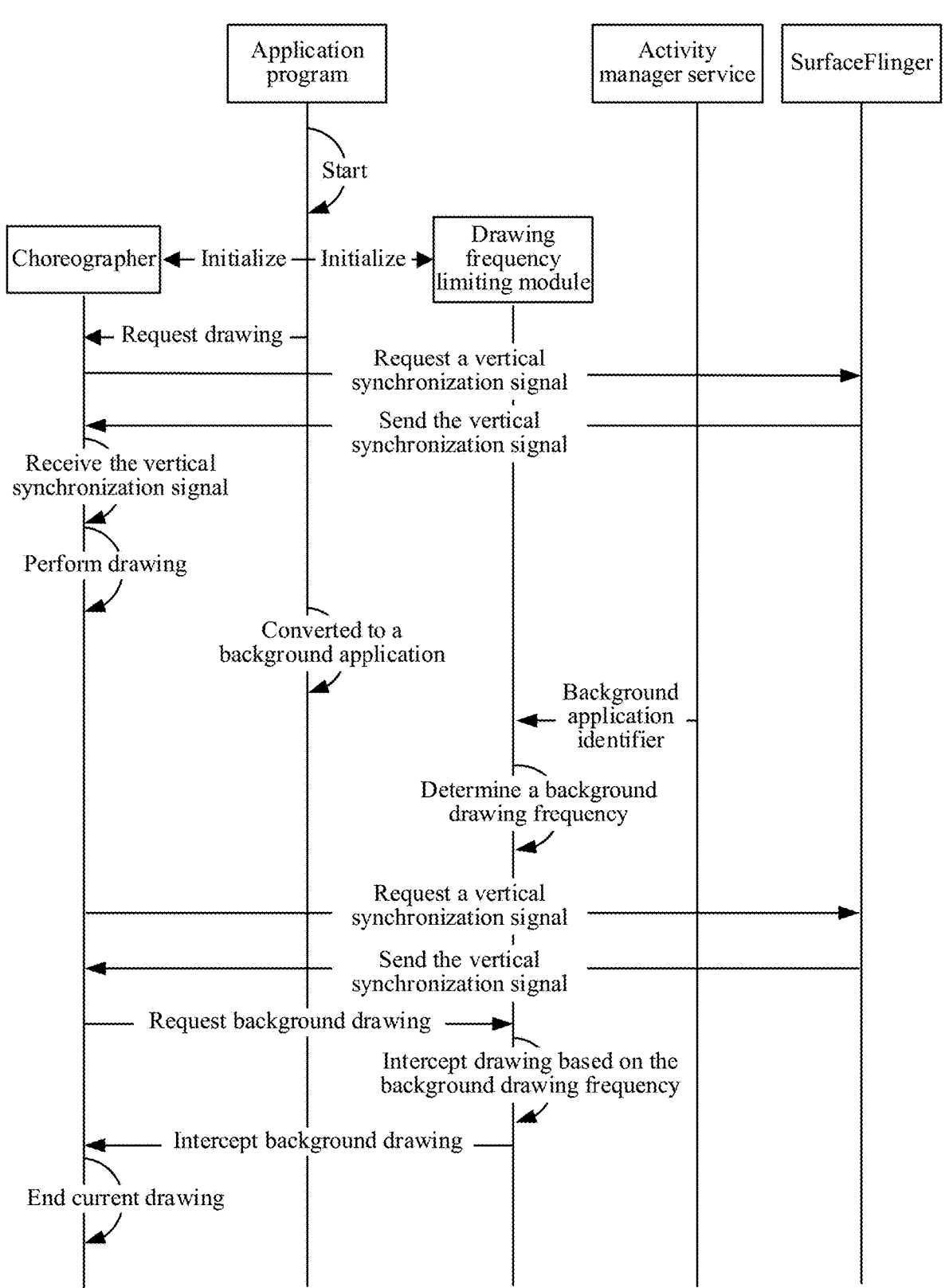
FIG. 17 is a schematic diagram of an example of a scenario of managing and controlling an invalid drawing operation of a background application according to an embodiment of this application.

With reference to the method for performing a drawing operation by an application shown in FIG. 12, the following uses content shown in FIG. 16 and FIG. 17 as examples to describe the method for performing a drawing operation by an application in embodiments of this application.

FIG. 17 is a schematic diagram of an example of a scenario of managing and controlling an invalid drawing operation of a background application according to an embodiment of this application.

As shown in FIG. 17, when a user starts an application program, an activity manager service may obtain registration information of the application program. The registration information uniquely identifies the application program. For example, the registration information may be a package name of the application program or a process name of the application program. This is not limited herein.

After the user starts the application program, the application program initializes at least one choreographer and at least one drawing frequency limiting module.

After the user starts the application program, the application program initializes the choreographer and the drawing frequency limiting module. The drawing frequency limiting module may call back a method in the activity manager service through an interface, to determine a running status of the application program, that is, whether the application program is a foreground application or a background application. In addition, the drawing frequency limiting module may further obtain the registration information of the application program by using the activity manager service. The registration information uniquely identifies the application program. For example, the registration information may be a package name of the application program, or the registration information may be a process name corresponding to the application program. This is not limited herein.

When the application program is a foreground application, the choreographer may perform a default drawing operation. Alternatively, before performing the default drawing operation, the choreographer requests the drawing frequency limiting module whether to allow current drawing. Before receiving a background application identifier, the drawing frequency limiting module always allows the choreographer to perform the default drawing operation.

When the application program is switched to a background application, the activity manager service determines that the application program is switched to a background application when detecting that a main activity of the application program performs an onStop method or/and that a cpuset parameter of a process of the application program is background or key-background. The activity manager service informs the drawing frequency limiting module that the application program becomes a background application. After determining that the application program is a background application, the activity manager service sends the background application identifier to the drawing frequency limiting module. The background application identifier may include the registration information of the application program. After receiving the background application identifier, the drawing frequency limiting module may determine a background drawing frequency according to a drawing frequency limiting policy.

When the application program becomes a background application, the choreographer of the application program sends a request for a vertical synchronization signal to a SurfaceFlinger because the application program is not frozen. In response to the request of the application program, the SurfaceFlinger sends the vertical synchronization signal to the choreographer of the application program.

After receiving the vertical synchronization signal and before performing a drawing operation, the choreographer of the application program sends a request for drawing information to the drawing frequency limiting module. When the choreographer receives a drawing permission request from the drawing frequency limiting module, the choreographer continues to perform the current invalid drawing operation. However, when the choreographer does not receive the drawing permission request from the drawing frequency limiting module, the choreographer directly ends the invalid drawing operation. For determining, by the drawing frequency limiting module based on the background drawing frequency, whether the choreographer is allowed to perform the current invalid drawing operation, refer to the content shown in FIG. 12. Details are not described herein again.

It should be noted that the drawing frequency limiting module may be located inside the choreographer of the application, or may be located in a service of an operating system.

With reference to the content in FIG. 12 and the drawing frequency limiting policy shown in Table 1, the scenario shown in FIG. 17 is specifically described by using an application program such as Music as an example.

When the user starts Music, the activity manager service can obtain a music package name com.android.mediacenter and a process name HWMusic. The activity manager server sends the package name or/and the process name of Music to the drawing frequency limiting module. The drawing frequency limiting module determines, based on a current vertical synchronization signal frequency (60 Hz) and registration information of Music, that a background drawing frequency of Music is 10 Hz.

When the user switches Music to the background, the activity manager server sends the background application identifier to the drawing frequency limiting module. In this case, after a choreographer of Music receives the vertical synchronization signal, the choreographer requests drawing from the drawing frequency limiting module. The drawing frequency limiting module allows the choreographer to perform a drawing operation once every five drawing requests received from the choreographer, so that a frequency at which the choreographer of Music performs the invalid drawing operation is reduced to 10 Hz.

When the user switches Music from the background to the foreground, the activity manager server notifies the drawing frequency limiting module: Music becomes a foreground application. In this case, the drawing frequency limiting module runs the choreographer to perform a drawing operation each time a drawing request is received from the choreographer.

Figure 18:
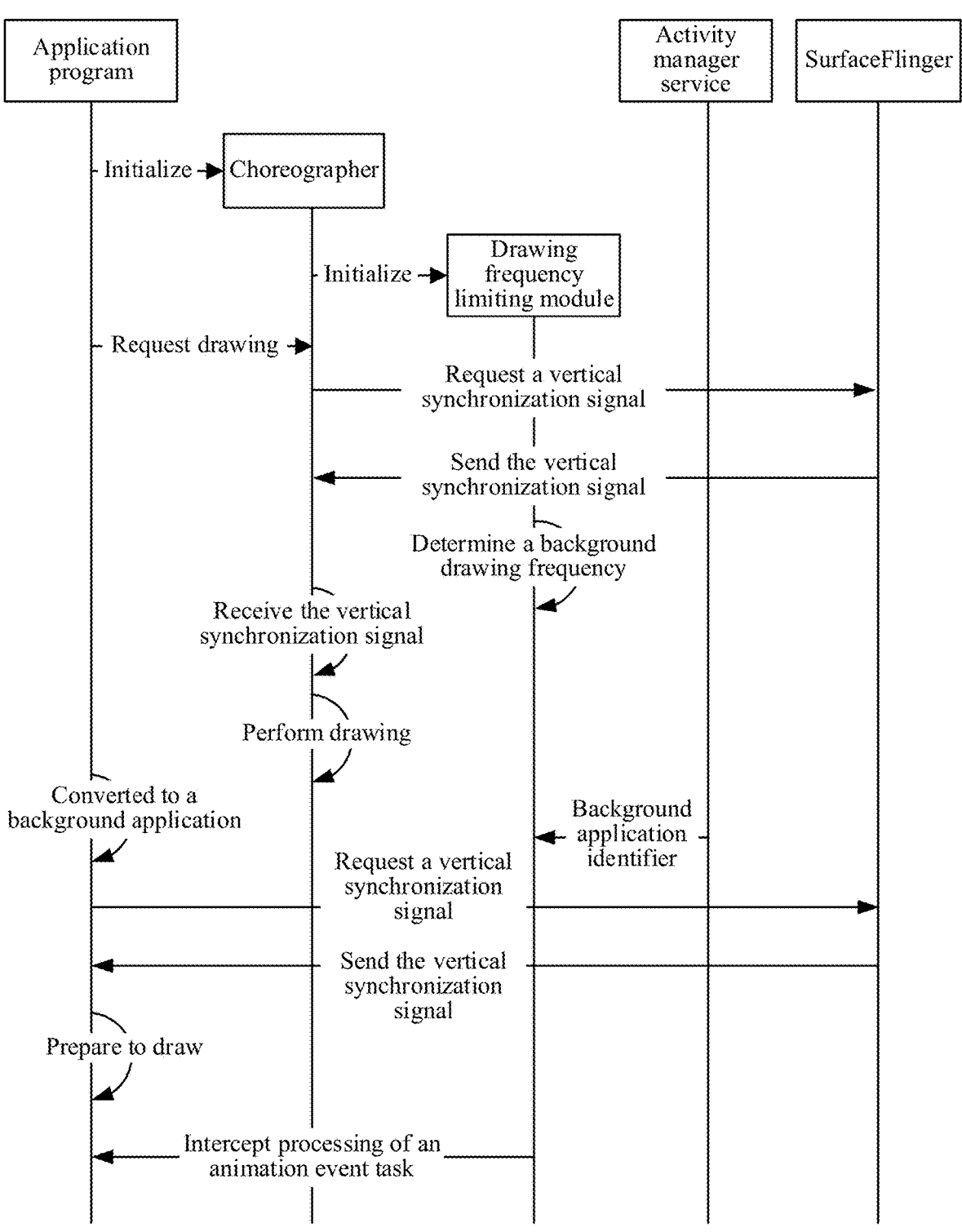
FIG. 18 is a schematic diagram of another example of a scenario of managing and controlling an invalid drawing operation of a background application according to an embodiment of this application.

FIG. 18 is a schematic diagram of another example of a scenario of managing and controlling an invalid drawing operation of a background application according to an embodiment of this application.

As shown in FIG. 18, similar to content shown in FIG. 17, after starting an application program, the user initializes a choreographer of the application program, and initializes a drawing frequency limiting module in the choreographer in a process of initializing the choreographer. After the drawing frequency limiting module is initialized, the drawing frequency limiting module determines a background drawing frequency of the application program according to a drawing frequency limiting policy.

When the application program is a foreground application, the choreographer of the application program performs a default drawing operation.

When the application program is switched to a background application, the activity manager service transmits a background application identifier to the drawing frequency limiting module. After receiving the background application identifier, the drawing frequency limiting module determines that the application program is a background application.

After the application program is switched to a background application, the choreographer requests and receives a vertical synchronization signal, and then uses a doFrame method to perform a drawing operation. The drawing frequency limiting module can intercept the choreographer from processing an animation event task, so that the choreographer does not actually perform the current invalid drawing operation.

After the application program is switched from a background application to a foreground application, the activity manager service sends a foreground application identifier to the choreographer of the application program. After receiving the foreground application identifier, the drawing frequency limiting module determines that the application program to which the choreographer belongs is switched to a foreground application, and therefore does not intercept the choreographer from processing the animation event task, so that the choreographer can perform a default drawing operation.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to embodiments of this application are completely or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or a part of the processes of the methods in the foregoing embodiments may be implemented by a computer program instructing related hardware. The program may be stored in a computer-readable storage medium. When the program is executed, the processes of the methods in the foregoing embodiments are performed. The foregoing storage medium includes: any medium that can store program code, such as a ROM, a random access memory RAM, a magnetic disk, or an optical disc.

What is claimed is:

1. A method, comprising:
starting, by an electronic device, a first application program;
performing, by the electronic device, a drawing operation at a first frequency when the first application program is a foreground application, wherein the drawing operation is for drawing a view for the first application program; and
performing, by the electronic device, the drawing operation at a second frequency after the first application program is switched from the foreground application to a background application, wherein the second frequency is less than the first frequency, and
wherein the first application program receives a vertical synchronization signal at the first frequency.

2. The method according to claim 1, wherein the performing, by the electronic device, the drawing operation at the second frequency after the first application program is switched from the foreground application to the background application comprises:
after the first application program is switched from the foreground application to the background application, indicating, by the electronic device, a choreographer of the first application program to respond to only N vertical synchronization signals in K received vertical synchronization signals, so that the electronic device performs the drawing operation at the second frequency, wherein K is a positive integer, and N is a positive integer less than K.

3. The method according to claim 1, wherein the performing, by the electronic device, the drawing operation at the second frequency after the first application program is switched from the foreground application to the background application comprises:
after the first application program is switched from the foreground application to the background application, indicating, by the electronic device, a choreographer of the first application program to process only animation event tasks corresponding to N vertical synchronization signals in K received vertical synchronization signals, so that the electronic device performs the drawing operation at the second frequency, wherein K is a positive integer, and N is a positive integer less than K.

4. The method according to claim 1, wherein the performing, by the electronic device, the drawing operation at the second frequency after the first application program is switched from the foreground application to the background application comprises:
after the first application program is switched from the foreground application to the background application, deleting, by the electronic device, animation event tasks corresponding to K-N vertical synchronization signals in K vertical synchronization signals received by a choreographer of the first application program, so that the electronic device performs the drawing operation at the second frequency, wherein K is a positive integer, and N is a positive integer less than K.

5. The method according to claim 2, wherein a first ratio of N to K corresponds to a second ratio of the second frequency to the first frequency.

6. The method according to claim 1, wherein the method further comprises:
after the starting the first application program, determining, by the electronic device, the second frequency according to a drawing frequency limiting policy and the first application program.

7. The method according to claim 1, wherein the method further comprises:
after the starting the first application program, determining, by the electronic device based on at least one of an activity manager service or a cpuset parameter of a process of the first application program, that the first application program is the foreground application or the background application.

8. A method, comprising:
starting, by an electronic device, a first application program;
displaying, by the electronic device, an interface of the first application program;
performing, by the electronic device, a drawing operation at a first frequency, wherein the drawing operation is for drawing a view for the first application program;
closing, by the electronic device, display of the interface of the first application program; and
performing, by the electronic device, the drawing operation at a second frequency, wherein the second frequency is less than the first frequency, and
wherein the first application program receives a vertical synchronization signal at the first frequency.

9. The method according to claim 8, wherein the performing, by the electronic device, the drawing operation at the second frequency comprises:
indicating, by the electronic device, a choreographer of the first application program to respond to only N vertical synchronization signals in K received vertical synchronization signals, so that the electronic device performs the drawing operation at the second frequency, wherein K is a positive integer, and N is a positive integer less than K.

10. The method according to claim 8, wherein the performing, by the electronic device, the drawing operation at the second frequency comprises:

indicating, by the electronic device, a choreographer of the first application program to process only animation event tasks corresponding to N vertical synchronization signals in K received vertical synchronization signals, so that the electronic device performs the drawing operation at the second frequency, wherein K is a positive integer, and N is a positive integer less than K.

11. The method according to claim 8, wherein the performing, by the electronic device, the drawing operation at the second frequency comprises:

deleting, by the electronic device, animation event tasks corresponding to K-N vertical synchronization signals in K vertical synchronization signals received by a choreographer of the first application program, so that the electronic device performs the drawing operation at the second frequency, wherein K is a positive integer, and N is a positive integer less than K.

12. The method according to claim 9, wherein a first ratio of N to K corresponds to a second ratio of the second frequency to the first frequency.

13. An electronic device, comprising:

a memory configured to store program instructions;

one or more processors configured to execute the program instructions, to cause the electronic device to perform:

starting a first application program;

performing a drawing operation at a first frequency when the first application program is a foreground application, wherein the drawing operation is for drawing a view for the first application program; and performing the drawing operation at a second frequency after the first application program is switched from the foreground application to a background application, wherein the second frequency is less than the first frequency, and wherein the first application program receives a vertical synchronization signal at the first frequency.

14. The electronic device according to claim 13, wherein the performing the drawing operation at the second frequency comprises:

after the first application program is switched from the foreground application to the background application, indicating a choreographer of the first application program to respond to only N vertical synchronization signals in K received vertical synchronization signals, so that the electronic device performs the drawing operation at the second frequency, wherein K is a positive integer, and N is a positive integer less than K.

15. The electronic device according to claim 13, wherein the performing the drawing operation at the second frequency comprises:

after the first application program is switched from the foreground application to the background application, indicating a choreographer of the first application program to process only animation event tasks corresponding to N vertical synchronization signals in K received vertical synchronization signals, so that the electronic device performs the drawing operation at the second frequency, wherein K is a positive integer, and wherein N is a positive integer less than K.

16. The electronic device according to claim 13, wherein the performing the drawing operation at the second frequency comprises:

after the first application program is switched from the foreground application to the background application, deleting animation event tasks corresponding to K-N vertical synchronization signals in K vertical synchronization signals received by a choreographer of the first application program, so that the electronic device performs the drawing operation at the second frequency, wherein K is a positive integer, and N is a positive integer less than K.

17. The electronic device according to claim 14, wherein a first ratio of N to K corresponds to a second ratio of the second frequency to the first frequency.

18. The electronic device according to claim 13, wherein the one or more processors are further configured to execute the program instructions, to cause the electronic device to perform:

after the starting the first application program, determining the second frequency according to a drawing frequency limiting policy and the first application program.

19. The electronic device according to claim 13, wherein the one or more processors are further configured to execute the program instructions, to cause the electronic device to perform:

after the starting the first application program, determining, based on at least one of an activity manager service or a cpuset parameter of a process of the first application program, that the first application program is the foreground application or the background application.

* * * * *